United States Patent [19]

Rodriguez et al.

[11] Patent Number: 5,303,384
[45] Date of Patent: Apr. 12, 1994

[54] HIGH LEVEL LANGUAGE-BASED ROBOTIC CONTROL SYSTEM

[75] Inventors: Guillermo Rodriguez, La Canada; Kenneth K. Kreutz, San Diego; Abhinandan Jain, Altadena, all of Calif.

[73] Assignee: The United States of America as represented by the Administrator of the National Aeronautics and Space Administration, Washington, D.C.

[21] Appl. No.: 786,499

[22] Filed: Nov. 1, 1991

Related U.S. Application Data

[63] Continuation-in-part of Ser. No. 459,438, Jan. 2, 1990.

[51] Int. Cl.⁵ .............................................. G05B 19/00
[52] U.S. Cl. .......................................... 395/99; 395/80; 395/89
[58] Field of Search .......................... 395/80, 89, 99, 77

[56] References Cited

U.S. PATENT DOCUMENTS

| | | | |
|---|---|---|---|
| 4,620,831 | 11/1986 | Poncet et al. | 395/99 |
| 4,680,519 | 7/1987 | Chand et al. | 395/99 |
| 4,757,459 | 7/1988 | Lauchner et al. | 395/99 |
| 4,763,055 | 8/1988 | Daggett et al. | 395/80 |
| 4,831,549 | 5/1989 | Red et al. | 395/89 |
| 5,008,834 | 4/1991 | Mizuno et al. | 395/80 |
| 5,079,491 | 1/1992 | Nose et al. | 395/99 |
| 5,084,826 | 1/1992 | Hariki et al. | 395/80 |
| 5,155,423 | 10/1992 | Karlen et al. | 395/80 |
| 5,204,942 | 4/1993 | Otera et al. | 395/80 |

OTHER PUBLICATIONS

Guillermo Rodriquez, "Random Field Estimation Approach to Robot Dynamics", IEEE Transactions on Systems, Man and Cybernetics, vol. 20, No. 5. Sep.-/Oct. 1990, pp. 1081-1093.
Guillermo Rodriquez et al., "A Spatial Operator Algebra for Manipulator Modeling and Control", *International Journal of Robotics Research*, Aug. 1991.
Guillermo Rodriquez, "Kalman Filtering, Smoothing, and Recursive Robot Arm Forward and Inverse Dynamics", *IEEE Journal of Robotics and Automation*, vol. RA-3, No. 6, Dec. 1987, pp. 624-639.
Gillermo Rodriquez, "Recursive Forward Dynamics for Multiple Robot Arms Moving a Common Task Object", *IEEE Transactions on Robotics and Automation*, vol. 5, No. 4, Aug. 1989, pp. 510-521.
A. Jain and G. Rodriquez, "Recursive Linearization of Manipilator Dynamics Models," *Proceedings of the IEEE International Conference on Systems, Man and Cybernetics*, Los Angeles, Calif., Nov. 4-7, 1990.

*Primary Examiner*—Michael R. Fleming
*Assistant Examiner*—Tariq R. Hafiz
*Attorney, Agent, or Firm*—John H. Kusmiss; Thomas H. Jones; Guy M. Miller

[57] ABSTRACT

This invention is a robot control system based on a high level language implementing a spatial operator algebra. There are two high level languages included within the system. At the highest level, applications programs can be written in a robot-oriented applications language including broad operators such as MOVE and GRASP. The robot-oriented applications language statements are translated into statements in the spatial operator algebra language. Programming can also take place using the spatial operator algebra language. The statements in the spatial operator algebra language from either source are then translated into machine language statements for execution by a digital control computer. The system also includes the capability of executing the control code sequences in a simulation mode before actual execution to assure proper action at execution time. The robot's environment is checked as part of the process and dynamic reconfiguration is also possible. The languages and system allow the programming and control of multiple arms and the use of inward/outward spatial recursions in which every computational step can be related to a transformation from one point in the mechanical robot to another point to name two major advantages.

36 Claims, 20 Drawing Sheets

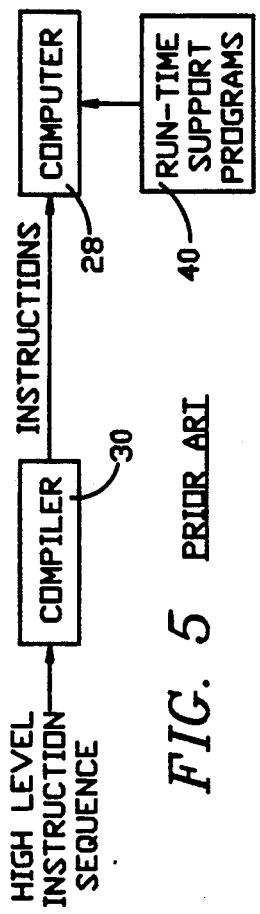
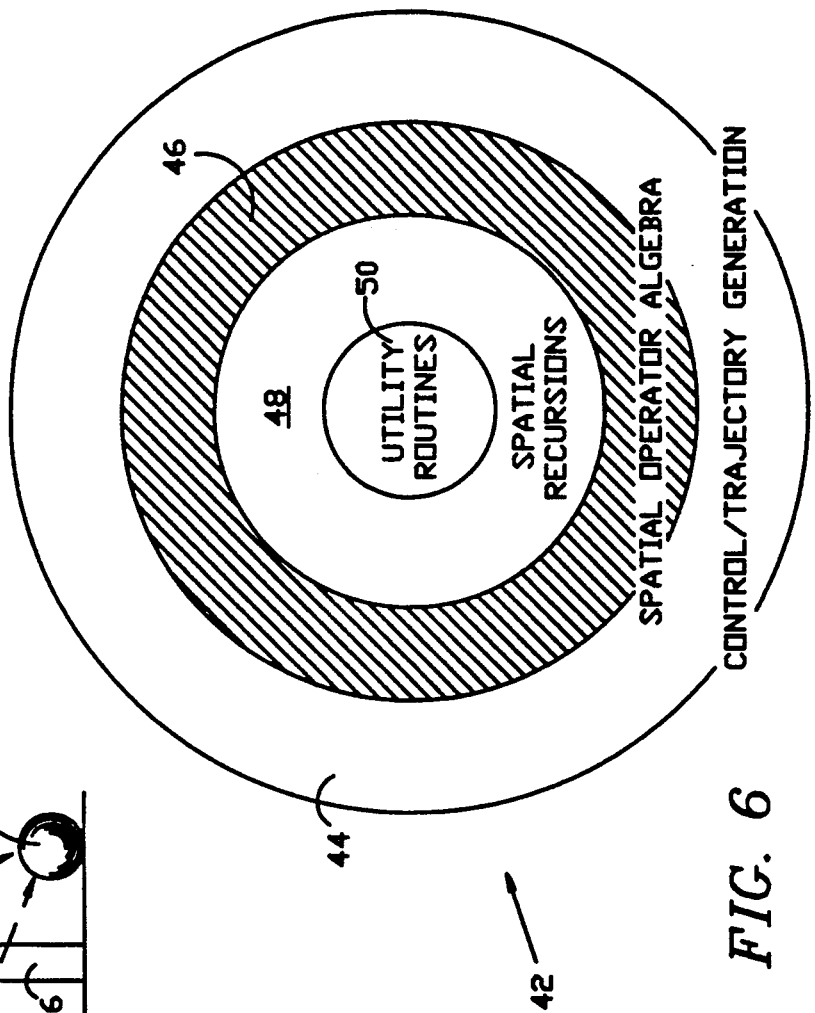
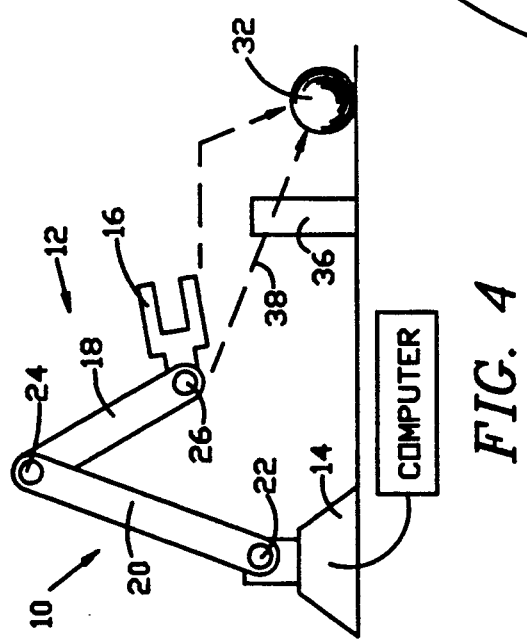
FIG. 4
FIG. 5 PRIOR ART
FIG. 6

JACOBIAN INVERSION  $J^{-1} = H \psi B$

INVERSE DYNAMICS  $M = H \phi M \phi^* H^*$

FORWARD DYNAMICS  $M^{-1} = (I-L^*)D^{-1}(I-L)$

...

$J = B^* \phi^* H^*$ $\sum_{k=1}^{N} \phi^T(k,0) H^T(k)$

SPATIAL OPERATIONS & ROBOTIC FUNCTIONS

- $J^{-1}$ (1,2) • JACOBIAN OPERATOR
- $J$ (1,2) • INVERSE JACOBIAN OPERATOR
- $M$ (2) • JOINT-SPACE MASS MATRIX
- $M^{-1}$ (2) • INVERSE JOINT-SPACE MASS MATRIX
- (2) • TASK-SPACE MASS MATRIX
- (2) • GRASP POINT CLOSED CHAIN MASS MATRIX
- (2) • TASK-REFERENCE POINT CLOSED CHAIN MASS MATRIX
- $F_m, F_s$ (2) • MOVE/SQUEEZE FORCE PROJECTION OPERATORS
- (2) • MOVE/SQUEEZE FORCE COMPUTATION
- (2) • GRASP POINT VELOCITY/ACCELERATION COMPUTATION
- $X$ (1,2) • FORWARD KINEMATICS
- (2) • UNDER-ACTUATED DYNAMICS
- (1,2) • INVERSE KINEMATICS
- (2) • FORWARD DYNAMICS
- $D$ (2) • ARTICULATED INERTIA MATRIX
- (2) • INVERSE DYNAMICS
- (2) • DYNAMICS WITH PRESCRIBED MOTION
- (1,2) • GRAVITY-LOADING FORCE COMPUTATION
- (2) • INERTIAL FORCES COMPUTATIONS
- (2) • INTERNAL FORCES COMPUTATION
- (2) • CLOSED-CHAIN DYNAMICS
- (2) • CONSTRAINT FORCES COMPUTATION
- (1,2) • QUADRATIC LOAD BALANCING
- (2) • MANIPULABILITY MEASURE COMPUTATION
- (2) • FORCE APPLICABILITY COMPUTATION
- (2) • GEARED DYNAMICS
- (2) • FLEXIBLE MANIPULATOR DYNAMICS
- $\delta L$ (2) • LINEARIZED DYNAMICS MODELS
- $\Lambda$ (2) • OPERATIONAL SPACE INERTIA (1) REQUIRED FOR KINEMATIC POSITIONING
(2) REQUIRED FOR CONTACT OPERATIONS

FIG. 25

HIGH LEVEL LANGUAGE-BASED ROBOTIC CONTROL SYSTEM

ORIGIN OF THE INVENTION

The invention described herein was made in the performance of work under a NASA contract, and is subject to the provisions of Public Law 96-517 (35 USC 202) in which the Contractor has elected not to retain title.

CROSS-REFERENCE TO RELATED APPLICATIONS

This application is a continuation-in-part application of U.S. application Ser. No. 07/459,438 filed Jan. 2, 1990 by Guillermo Rodriguez et al. entitled "HIGH LEVEL LANGUAGE-BASED ROBOTIC CONTROL SYSTEM."

TECHNICAL FIELD

The invention relates to computer systems for controlling robots and, more particularly, to a high level language-based control system for a robot comprising, a digital control computer operably connected to the robot to control the movement functions thereof, the control computer including program execution means for executing control programs; means for inputting the control programs into the digital control computer for execution thereby; and, translator means for reading sequences of robot control statements and for generating control programs therefrom defining robot control sequences, the translator means comprising, first translator means for accepting as inputs thereto statements in a high level spatial operator algebra language and for outputting machine language sequences reflecting the inputs to the first translator means and executable by the digital control computer, and second translator means for accepting as inputs thereto statements in a high level robot applications language and for outputting statements in the high level spatial operator algebra language reflecting the inputs to the second translator means.

The preferred embodiment additionally comprises robot simulation means operably connected to the digital control computer for executing the programs in a simulation mode prior to executing them to control the robot and for allowing the digital control computer to execute the programs to control the robot only if no problems exist in the simulation mode. It also includes reconfiguration means connected to the robot simulation means for reconfiguring the programs when problems exist in the simulation mode to a form in which no problems exist in the simulation mode before allowing the digital control computer to execute the programs to control the robot.

Also in the preferred embodiment, robot and environmental definition means are connected to the robot simulation means for holding and providing data about the robot and the environment in which the robot is working which is used to determine if problems exist in the simulation mode. Preferably, the robot and environmental definition means includes means for dynamically changing the data about the robot and the environment in which the robot is working.

BACKGROUND ART

Robotic control systems and robots are a fairly new technology. The first digital computer-controlled apparatus operating in real time began to appear about the early 1960s. Before that, "control" took the form of analog controllers which could read analog inputs from sensors (e.g. pressure, temperature, etc.) and output electrical, pneumatic, or other forms of control signals to mechanical operators connected thereto for opening valves, etc. whereby the controlled function could be maintained at pre-established operating levels.

With the advent of digital computers, a number of sensors and operators could be connected to the computer and be controlled by the programs thereof. The programs, of course, could implement far more elaborate control logic for the system as a whole than the proportional band, rate, and reset functions typically implemented by the prior art controllers operating on an individual (and non-interconnected) basis.

What could probably be considered as the first industrial "robots" were the numerically controlled (NC) machines and assembly apparatus. Where previously such apparatus was operated under the control of human operators (with attendant possibility of error), the NC-controlled machines could repetitively perform manufacturing and assembly operations without error. Early versions of NC machines employed pre-punched paper tape inputs to provide the positional movement sequences for the machine. Later, the numerical sequences were stored in the memory of a digital computer.

While the mechanical aspects of such industrial (where the term "industrial" includes robots employed in space operations) robots have become more exotic in the period since their first introduction, the control (and programming) considerations thereof have not moved much beyond the starting point. Take for example the robot 10 of FIG. 1. The robot 10 comprises an arm 12 attached to a base 14 on one end and having a gripping hand 16 on the opposite end. The arm 12 comprises an upper portion 18 and a lower portion 20. There is a powered "shoulder" joint 22 connecting the upper portion 18 to the base 14, a powered "elbow" joint 24 connecting the upper portion 18 to the lower portion 20, and a "wrist" joint 26 connecting the lower portion 20 to the gripping hand 16. The robot 10 is connected to have the powered joints 22, 24, 26 operated by a computer 28 so as to effect desired movement of the gripping hand 16 as, for example, to pick up and move an object. While early NC machines were simply moved known amounts from a known starting point to effect their functions, robots such as robot 10 typically have force and motion sensors (not shown) incorporated within their joints so that there is feedback information available to the computer 28. Also, with an articulated arm such as arm 12, the dynamics of movement are much more exotic and important to the accuracy of the robot than simply moving a clamped part in X and Y axes along a bed under a rotating machine tool which is moved up and down in the Z axis to cause the machining of the part. Accordingly, the instructional sequences to the joints 22, 24, and 26 from the computer 28 are highly complex; and, like the NC apparatus where the sequence of movements to effect the desired machining of a part was pre-programmed into the controlling apparatus, the sequence of movements for the joints 22, 24, and 26 is pre-programmed into the computer 28. If any changes occur in the robot 10 or in the actions to be performed thereby, the instruction sequence must be re-programmed.

To fully comprehend the problem at hand, one must consider the typical environment for digital computer programming and the prior art aids provided therefore. The computer 28 only performs slavishly a sequence of machine language instructions which have been pre-loaded for execution at run time. In the execution of its instructions, a real-time computer can perform arithmetic calculations, make decisions, input dynamic information from sensors, and input information from tables. The tables can contain pre-established information and/or dynamically altered information. Typically, as depicted in FIG. 5, there are pre-defined instruction run-time support programs 40 (such as subroutines) that can be used by the main instruction sequence to accomplish routine tasks of a repetitive nature (such as trigonometric function calculation) necessary to the accomplishment of overall system performance. While the first programmers were forced to do their programming in machine language (an extremely tedious and error-prone process), support programs in the form of assemblers and then compilers (such as the compiler 30 of FIG. 5) made later (and present) efforts much easier to program and to debug. Through processes of experimentation and trial and error, formulas for expressing movement of the various arms and joints of a robot have been established to some degree of accuracy. While these formulas are complex and include many terms, the programming process has been greatly simplified by high level language compilers such as FORTRAN. The system's analyst/programmer must still establish and set down the sequence of formulas which is assumed will accomplish the desired sequence of movements to effect a required end result. As depicted in FIG. 2, the sequence of formulas comprising the movement instruction sequence is then input to a compiler 30 (a program running in a computer) which outputs a sequence of machine language instructions which are then loaded into the robot controlling computer 28 for later execution.

The instruction sequence to move the hand 16 of the robot 10 so as to pick up the object 32 in FIG. 1 can run several pages. Note that this is with the base 14 fixed and the object 32 fixed at a pre-established location. The instruction sequence is of such length simply to account for all the forces and inertial factors of the various joints 22, 24, 26 and the arm portions 18, 20 as the gripping hand 16 is moved from an initial point, to the object 32, and from thence to a final point. The object, of course, is to move the hand 16 smoothly along a trajectory from point to point and not in a jerky fashion constantly correcting from deviation errors. The robot must also apply a pre-described amount of force or stress to the objects that it is handling. As in all real-time movement control systems, a principle design factor in the system design and programming process is the elimination of any instability in the feedback control loop. Instability can lead to the robot 10 going into increased oscillations (leading finally to an error shutdown before damage can occur) or the inability to finally position the hand 16 at a desired point because of excessive overshoot as the result of each movement in a corrective direction.

Because of the foregoing approach to basic robotic programming and control, a computer-controlled two armed robot as shown in FIG. 3 is virtually impossible employing prior art techniques. This is particularly true in situations where the robot task is not numerically pre-programmed and must be changed or designed by the human operator at run time. The object of the robot 10' shown in FIG. 3 is for the two arms 12, 12' to pick up the two object halves 34, 34', bring them into alignment with one another, and push them together to form the object 32 while simultaneously lifting the object 32 up to and placing it on the shelf 33. A human performing the task would first pick up the two object halves 34, 34', bring them into alignment, and then push them together to form the object 32. Having formed the object 32, the object 32 would then be lifted up and be placed on the shelf 33. Obviously, the robot 10' has the potential to perform the assembly and placement process simultaneously. Using the prior art programming technique described above, however, it would be virtually impossible for a human programmer to program the sequence of operations necessary to cause the robot 10' to do so. As can be appreciated from pondering the various aspects which must be taken into consideration as compared with the simple one-arm robot of FIG. 1, the complexity with two arms and two components to perform a combined assembly and placement operation is vastly greater.

Another aspect which is not even considered in prior art robotic control schemes is changing dynamics of the environment. Take the situation depicted in FIG. 4, for example. This is the single armed robot 10 of FIG. 1 into which an obstacle 36 has been placed. If the robot 10 has been pre-programmed to move the hand 16 along the trajectory indicated by the dashed arrow 38, it will do so and strike the obstacle 36 rather than moving to the alternate trajectory indicated by the dashed arrow 40 as necessary to reach over the obstacle 36.

Yet another aspect of robotic control which is not even considered by prior art robotic control systems is the checking of anticipated movement in a fast simulation mode prior to actual implementation on a real-time basis to assure that what is desired has a high probability of occurring and adjusting the projected movement until the desired object is achieved in simulation prior to actual implementation.

Statement of the Invention

Accordingly, it is an object of this invention to provide a programming and run-time support package for robotic system configuring and operation which is simple and easy to use.

It is another object of this invention to provide a programming and run-time support package for robotic system configuring and operation which permits the programmer/system's analyst to direct the operation of complex robotic equipment which cannot be programmed by prior art techniques.

It is still another object of this invention to provide a programming and run-time support package for robotic system configuring and operation which checks anticipated movement in a simulation mode prior to actual implementation on a real-time basis to assure that what is desired has a high probability of occurring and which adjusts the projected movement until the desired object is achieved in simulation prior to actual implementation.

It is a further object of this invention to provide a programming and run-time support package for robotic system configuring and operation which checks a dynamically-changeable environment definition to assure capability of intended movement and redefine trajectories as necessary to assure non-interference with intended movement.

It is a still further object of this invention to provide a means to easily program and modify the mathematical models that must be embedded into a robot control computer in order for it to exhibit a certain amount of intelligence in responding to higher level user commands such as MOVE, GRASP, etc.

A further object of this invention is to provide a very efficient implementation of the above-mentioned mathematical models by means of a very efficient set of algorithms (i.e. sequences of computational steps) that compute the necessary robot trajectories and motions.

Another object of this invention is to provide a very efficient set of algorithms which implement all robot mathematical computations recursively and in which the number of arithmetical operations (additions, multiplications, divisions, etc.) increasing only linearly with the number of degrees of freedom.

Other objects and benefits of this invention will become apparent from the detailed description which follows hereinafter when taken in conjunction with the drawing figures which accompany it.

BRIEF DESCRIPTION OF THE DRAWINGS

FIG. 4 is the simplified drawing of one-arm robot system of FIG. 1 showing a dynamic situation which is unsolvable by prior art robotic control systems.

FIG. 5 is a block diagram of a prior art high-level compilation and run-time approach to computers utilized in real-time control systems such as robotics.

FIG. 6 is a simplified diagram showing the multi-level approach to a robotic control system and the generation of instructions therefor.

FIG. 25 illustrates a table of high level operators which can be constructed in accordance with the invention.

DETAILED DESCRIPTION OF THE INVENTION

Figure 3:
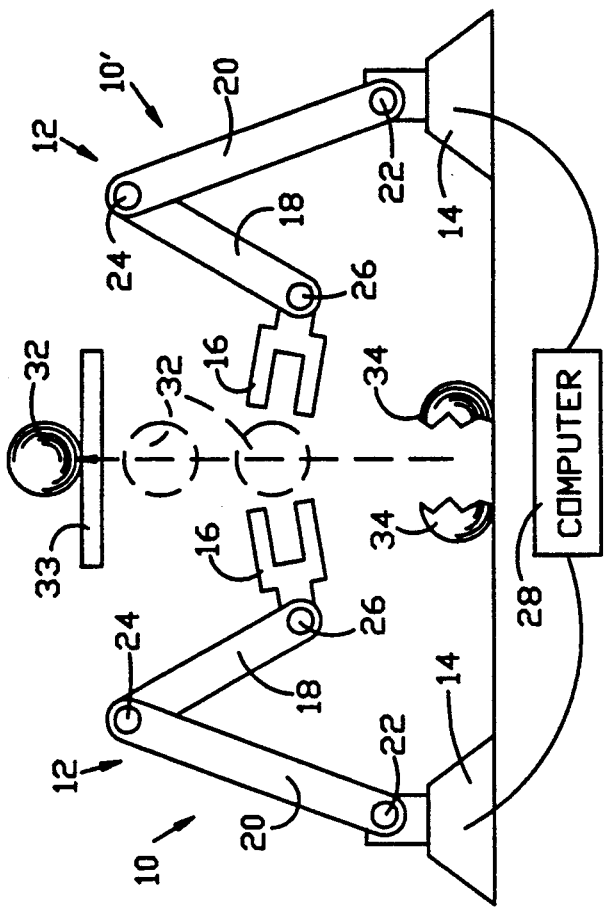
FIG. 3 is a simplified drawing of two-arm robot system as wherein the present provides significant benefits.
Figure 1:
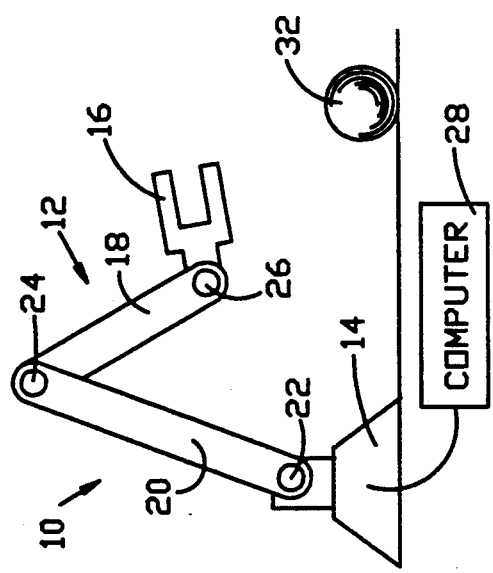
FIG. 1 is a simplified drawing of one-arm robot system as wherein the present could be used.
Figure 2:
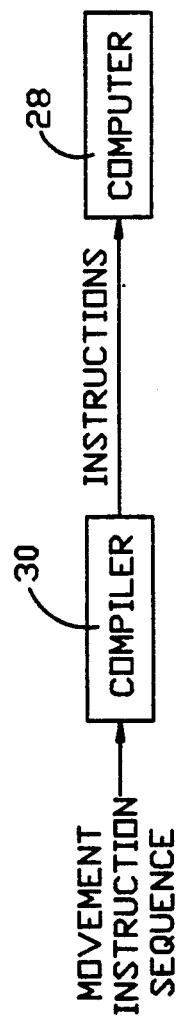
FIG. 2 is a block diagram of a prior art high-level compilation approach to generating instructions for a computer controlling a robot.

The construction of the robotic program generation and run-time support system 42 of the present invention is depicted symbolically in FIG. 6. Unlike the prior art real-time compiler and run-time system of FIG. 5, the system 42 of this invention is comprised of multiple nested layers of increased complexity. The programmer/analyst deals only with the outer simplified layers while the complex inner layers are transparent. Moreover, as will be seen shortly, the outermost layer is very simple and intended for use by unsophisticated applications programmers while the next layer is more complex and intended for programmers with training in system modification and enhancement.

The system 42 of the present invention is made possible by the inclusion of two high level language implementations within one compilation system. This is novel in and of itself to the best of the applicant's knowledge. Typically, a compiler accepts input statements in its high level language syntax. The final output is a string of machine language instructions (the object program) which will perform the logic of the high level language statement sequence as input (i.e. the high level language program). Internally, the compiler may break the high level language statements into intermediate language (IL) statements which are then turned into object code by various "passes" of the compiler. The IL statements are never seen or accessed by a user of the compiler and are only part of a compiler implementation scheme which allows a compiler to generate object code (i.e. machine language) for different computers by the replacement of only a small portion of the programming which translates the IL into machine language.

By contrast, the system 42 of this invention accepts applications level high level statements from an applications programmer into the outer layer 44. As will be discussed in greater detail shortly, the applications programmer describes control and trajectory objectives in broad terms such as MOVE, GRASP, etc. The output of the outer layer 44 is a series of spatial operator algebra statements which comprise the second high level language of the system. Programming can also be done in the spatial operator algebra statements by those more skilled in the programming and robotic system analysis art so as to easily and accurately define the various robotic functions. The spatial operator algebra statements (either as output by the outer layer 44 or as directly input thereto) are compiled by the second layer 46, which outputs statements of implementation formulae such as those used in the prior art for initial programming. Thus, it can be seen that the programming job is simplified by either one or two layers of programming language simplification in the system 42 of the present invention. The second layer 46 output is input to the third layer 48, which performs the spatial recursions with support from the utility routines of the inner layer 50.

Figure 7:
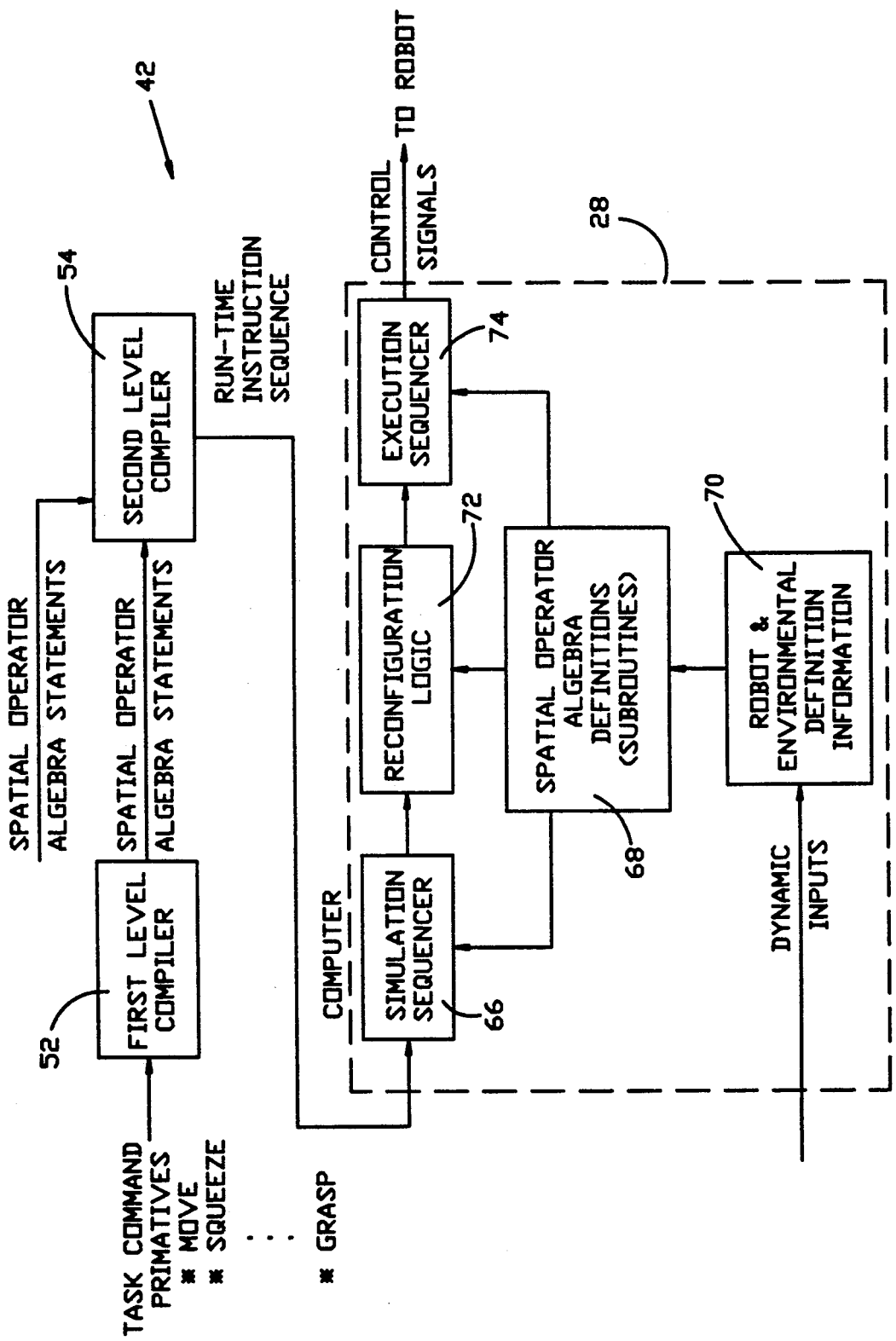
FIG. 7 is a functional block diagram of a robotic instruction generation and run-time system according to the present invention in a preferred embodiment thereof.

The system 42 of the present invention can be seen from a different perspective by reference to FIG. 7. An applications programmer wishing to program a sequence of operations for the two-armed robot 10' of FIG. 3 would do so in a series of high-level statements oriented to robot movement and control. As indicated in the figure, representative operators might include MOVE, SQUEEZE, GRASP, and the like. For example, if the grasping hands 16 of the arms 12 of the robot 10' were designated as A and B, a programmer might include a statement sequence such as:

```
MOVE A TO LOCATION 1
GRASP OBJECT
MOVE A TO LOCATION 2
RELEASE
```

As can be seen, the programmer works with simplified, straight forward statements and concepts. Unlike the prior art approach to robotic programming as described above, the esoteric aspects of robotic movement are completely transparent on the applications level. The robot programming language of this invention differs from other existing languages in the following areas:

* It coordinates the motion of two or more arms working in concert to execute a task.
* It has embedding therein a complete mathematical model of the robot which allows precise control of the forces applied to objects ——this model being transparent to the user.
* Motion and force models contained therein are also completely transparent to the user.
* It contains algorithms which execute very fast because they implement all robot mathematical computations recursively.

The applications language is input to a first level compiler 52 as depicted in FIG. 7. The compiler 52 interprets the syntax and content of the applications statements in the manner of any typical compiler and outputs a sequence of spatial operator algebra statements which, if executed with proper support and supplemental run-time inputs, will perform the applications functions called for by the applications statement sequence which was input. Such compilation processes and related matters are, of course, well known to those skilled in the art and, therefore, in the interest of simplicity and the avoidance of redundancy such matters will not be addressed in any detail herein.

The system 42 of the invention employs a spatial operator algebra. This algebra is described in detail in a paper by the one of the inventors herein, Guillermo Rodriguez, "Random Field Estimation Approach to Robot Dynamics," *IEEE Transactions on Systems, Man and Cybernetics*, Vol. 20, No. 5, Sep./Oct. 1990, pp. 1081-1093 and in other publications cited below herein. The algebra is described below herein with reference to cited definitions of low level operators given in the publications referred to herein. The spatial operator algebra described herein is a specialized high level computer language. As in other specialized computer languages, there are operators referring to operations unique to the robotic control and manipulation environment. For example, the FORTRAN language is intended for the implementing of formulas comprised principally of arithmetic and trigonometric functions. Thus, FORTRAN employs operators such as +, −, *, and / to indicate add, subtract, multiply, and divide, respectively. JOVIAL, on the other hand, is intended for logic and record manipulation. Thus, in addition to the arithmetic operators it includes operators such as IF, GREATER, EQUAL, and THEN.

Complex functions included within the complement of operators of a high level language are typically supported by run-time programs implemented as subroutines. Thus, a * (multiply) operator generates a MULTIPLY command in machine language as this is an operation typically supported by the hardware of a digital computer. On the other hand, a TAN(f) [i.e. tangent of f] operation will generate a return branch to the tangent subroutine passing the "f" value in the process. In this regard, the spatial operator algebra of the present invention is no exception and no novelty is claimed for such an implementation. Thus, the various operators of the spatial operator algebra, when compiled, generate return branches to various subroutines which accomplish uniquely robotic control and manipulation functions; and, they pass the associated parameters necessary to the particular computation to the subroutine.

As those skilled in the art will readily appreciate, by making both the applications operators and spatial operator algebra operators usable by programmers, the system 42 of this invention becomes a very powerful tool for robotic applications. As will undoubtedly be surmised by those skilled in the art from the from the foregoing brief description, the applications operators are implemented by the first level compiler 52 basically as macros. In other words, when the compiler 52 sees an applications operator, it substitutes its equivalent sequence of spatial operator algebra operators. This is not typical of a high level language compiler; but, provides the system 42 of this invention with a reconfigurability not typical of other high level language systems. Usually, a compiler has a fixed programming sequence which generates the machine language statements which implement the logic and formulas of the high level language input stream. By employing a macro-based approach, trained users (i.e. systems programmers) can reconfigure their compiler to generate spatial operator algebra operator sequences that more accurately implement the intent of the applications operators for the specific robotic environment of interest.

This reconfigurability is a multi-level capability within the system 42 of this invention. Spatial operator algebra operator sequences generated by programmers or the first level compiler 52 are input to a second level compiler 54. The second level compiler 54 is also macro-based and supported by run-time subroutines. Thus, while it is more difficult and requires a highly skilled individual to accomplish it, both the second level compiler 54 and the support subroutines can be modified, if necessary, to more accurately perform the robotic functions in a particular environment. The support subroutines which actually perform the functions of the spatial operator algebra operators must actually implement the highly complex instructional sequences as described above which have been used in the prior art to cause the robotic elements to perform as desired and required. Within the system 42 of this invention, however, these complex sequences are broken down to their simplest elements which are, in turn, implemented as subroutines. Thus, to reconfigure the way in which a particular spatial operator algebra operator is implemented, the subroutine calling sequences comprising the support subroutine performing that operator and/or the subroutines themselves need only be modified.

Figures 8, 9:
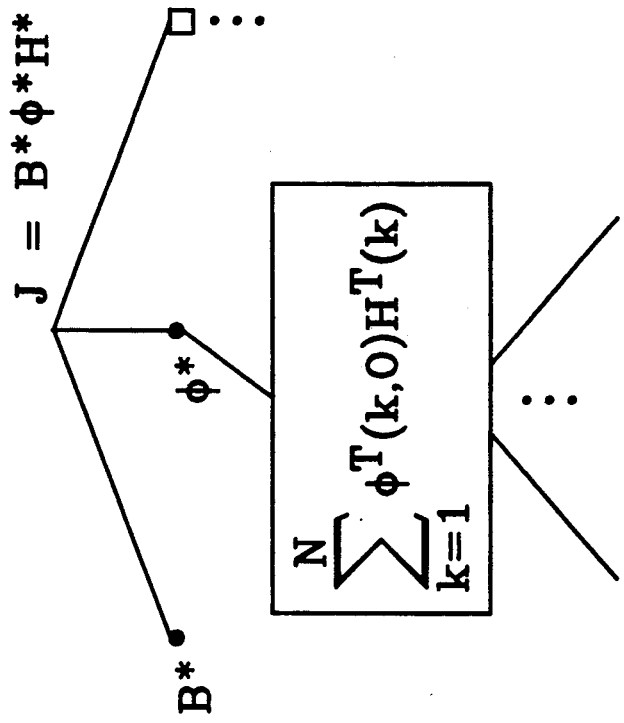
FIG. 8 is a drawing giving several examples of robotic functions stated in the spatial operator algebra of the present invention.
FIG. 9 is a drawing depicting how the various operators of a robotic functions stated in the spatial operator algebra of the present invention are also defined in terms of the spatial operator algebra.

The foregoing is an important aspect of the present invention which is unique to the present invention and, therefore, deserves further explanation, description, and example. For this purpose, we will leave FIG. 7 for the moment and turn first to FIG. 8. As depicted therein each typical robotic function is defined in terms of spatial operator algebra operators. As depicted in FIG. 9, each spatial operator algebra operator has a built-in order-N implementation algorithm which is accomplished by a series of subroutines which can also be described in terms of the spatial operator algebra operators. Let us assume that a typical single-line operator equation to be implemented is as follows:

$$\theta = (I - L^*)D^{-1}(I - b^*\Omega^{-1}b)D^{-1}(I-L)T$$

Figure 10:
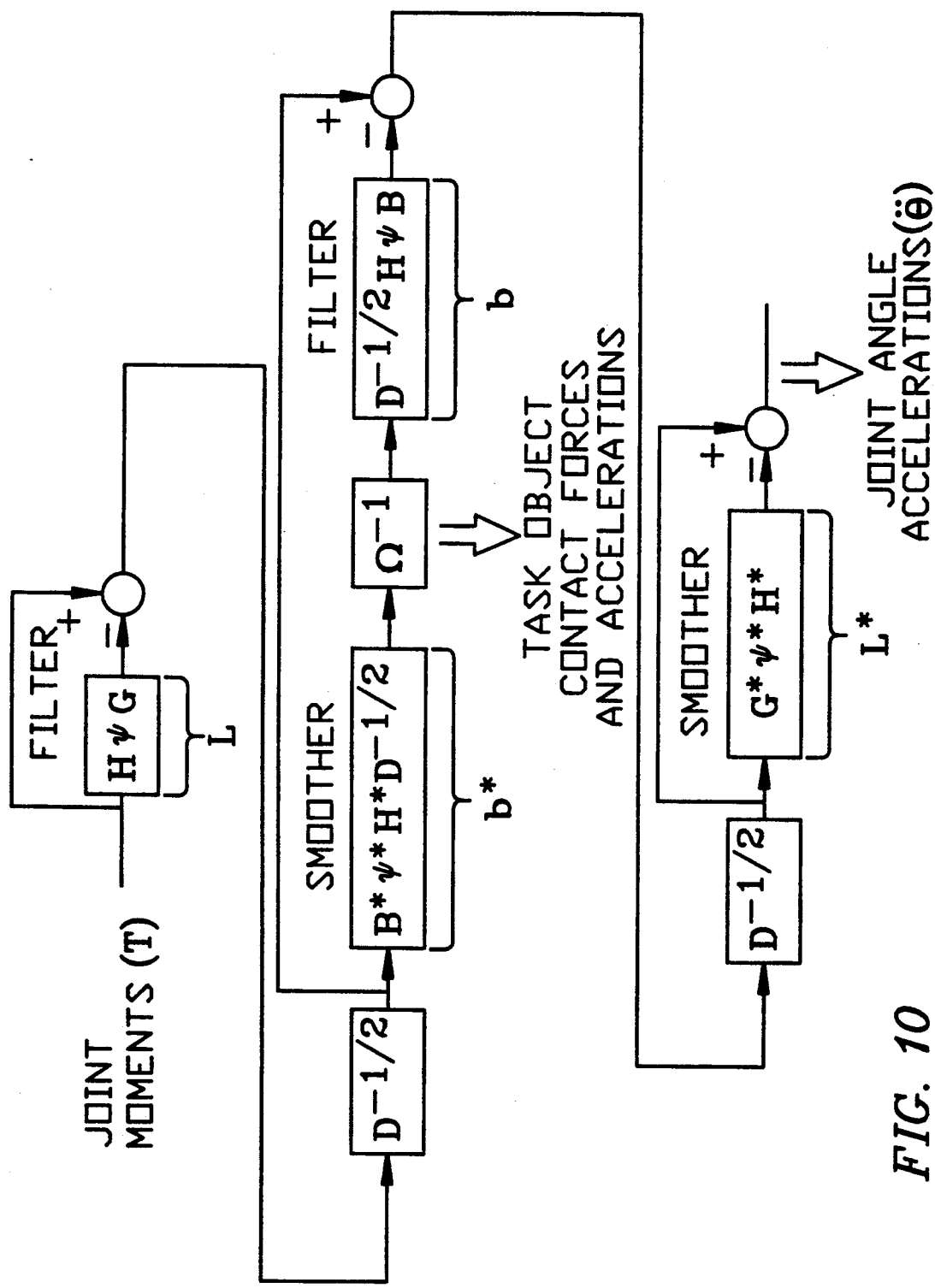
FIG. 10 is a block diagram of a robotic function stated in the spatial operator algebra of the present invention.
Figure 11:
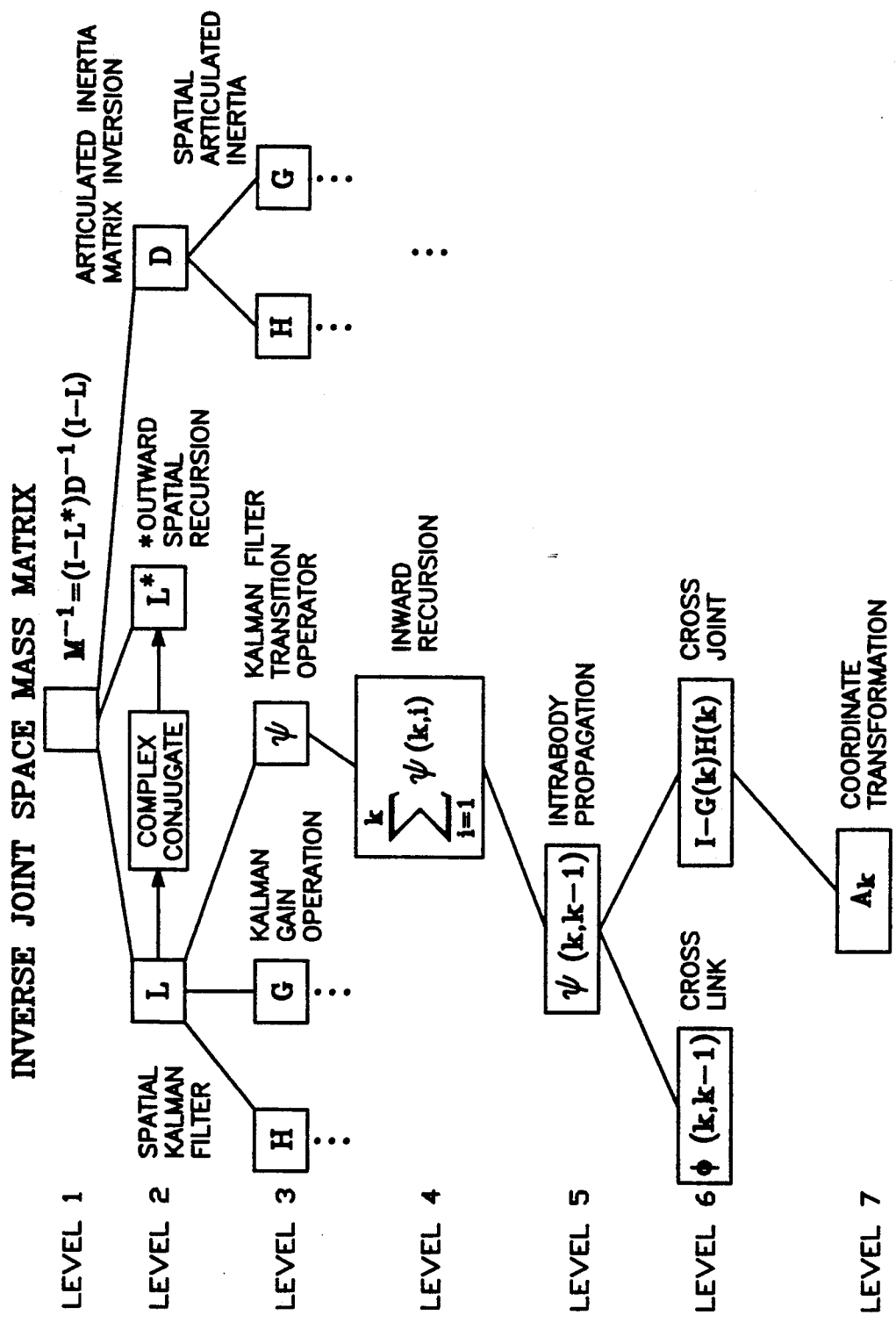
FIG. 11 is a drawing depicting in another manner how the various operators of a robotic functions stated in the spatial operator algebra of the present invention are also defined in terms of the spatial operator algebra and how this definition process exists on many levels.

The block diagram thereof appears in FIG. 10. A different representation of the implementation of the single-line operator equation $M^{-1} = (I - L^*)D^{-1}(I - L)$ appears in FIG. 11. As can be seen more clearly therein, each operator is defined in terms of the operators which comprise it. Thus, the actual programming of machine language code is confined to the bottom level operators which can no longer be defined in terms of other spatial operator algebra operators. The major programming effort for initial operation definition and for subsequent redefinition (if necessary) is accomplished using the simple spatial operator algebra operators of this invention.

Figure 15:
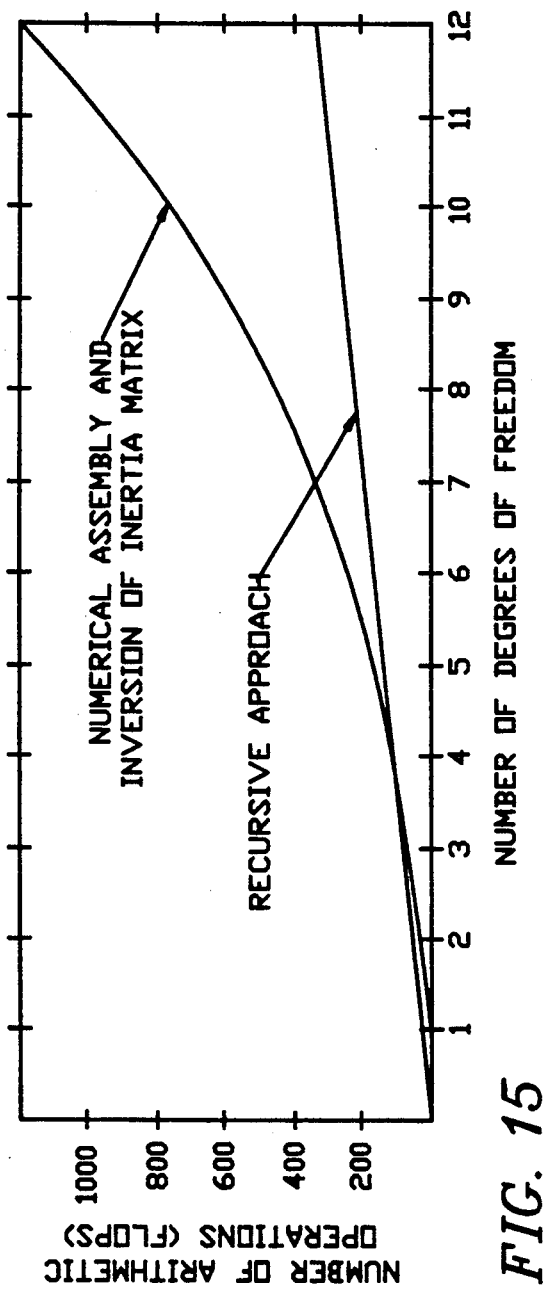
FIG. 15 is a graph of number of arithmetic operations versus number of degrees of freedom depicting how the recursive approach of this invention reduces the number of arithmetic operations even for moderately complex problems.
Figure 16:
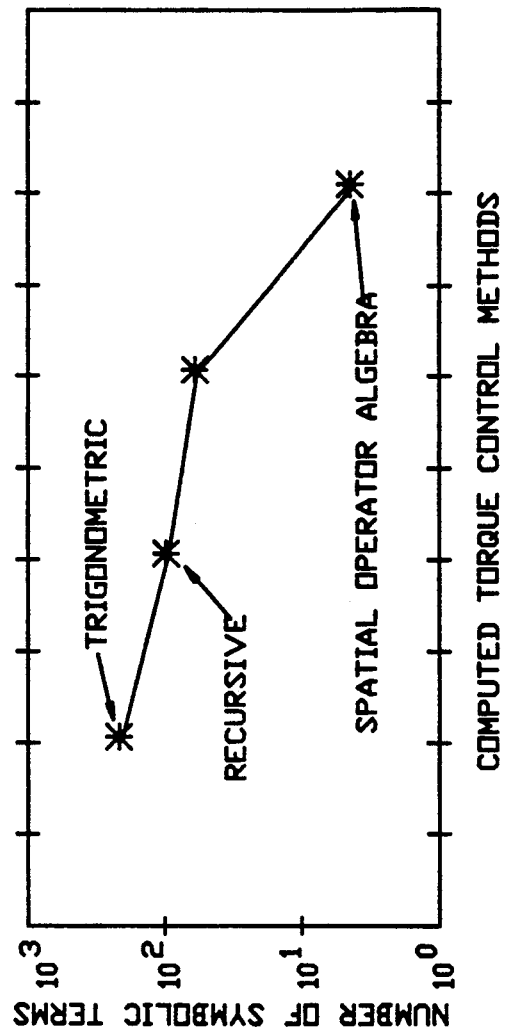
FIG. 16 is a graph of number of symbolic terms for computed torque control methods depicting how the spatial operator approach allows order or magnitude reductions in the number of terms used by a system designer.

It is important to note at this point that the spatial operator algebra of this invention reduces by at least two orders of magnitude the number of symbols that the system designer has to use to specify the mathematical model embedded in the robot control computer. It thereby organizes computations and computer programs in the robot control computer into a hierarchical modular framework that is easy to test and debug. The number of symbols used is minimal. Thus, there can never be anything simpler for implementing robot control mathematical models. In this regard, attention is directed to the two graphs of FIGS. 15 and 16. As depicted in FIG. 15, with the recursive approach of this invention employing the unique algebra thereof, the algorithms implement all robot mathematical computations recursively such that the number of arithmetic operations (additions, multiplications, divisions, etc.) increases only linearly with the number of degrees of freedom whereas prior art is based on algorithms wherein the number of operations increases with the square or cube of the number of degrees of freedom. This advantage is quite significant as soon as robots including six or more degrees of freedom are used. FIG. 16 depicts how, for example, when accomplishing torque control the prior art trigonometric approach will require over 200 symbolic terms, the prior art recursive approach (the most commonly used technique at this time) will require approximately 100 symbolic terms, and the spatial operator algebra of this invention will require less than 10.

As those skilled in the art will undoubtedly have realized by now, the flexible nature of the spatial operator algebra of this invention provides similar flexibility in the definition of applications operators. In this regard, see for example FIG. 12. Recalling the operational problem postulated for FIG. 3 (i.e. pick up, assemble, and move to shelf), if the operators MOVE and SQUEEZE have been defined within the system, a new operator MOVE AND SQUEEZE can be implemented by simply combining the two individual elements thereof. This is effectively accomplished by using another novel approach to robotic control programming only possible with the system 42 of the present invention. The concept is illustrated in FIG. 13. Given that there is a robot comprising two articulated arms 12 having segments 56 joined at powered joints 58 holding a task object 60. In a typical prior art robotic control system, the programmer is constrained (because of the extreme complexity of the problem and the limited available tools) to attack programming of the arm from an outward recursion point of view. As stated earlier, it would be virtually impossible to program a two arm cooperative effort using prior art techniques; but, assuming that it was possible, the above outward recursion limitation would apply. By contrast, the ease of use of the system 42 of the present invention allows the programmer to compute the inertia of each arm 12 as seen from the tip or outermost end. Thus, as depicted in FIG. 13, the arm, joint, and task object problem is converted into a task object problem having two point inertias 62 (corresponding to the two arms 12) associated therewith. To move the task object 60 from point A to point B, therefore, an inward recursions to effect movement of the two point inertias 62 are performed (using the easily implemented spatial operator algebra, of course). The necessary movement of each joint 58 simply falls out of the calculation.

Figure 13:
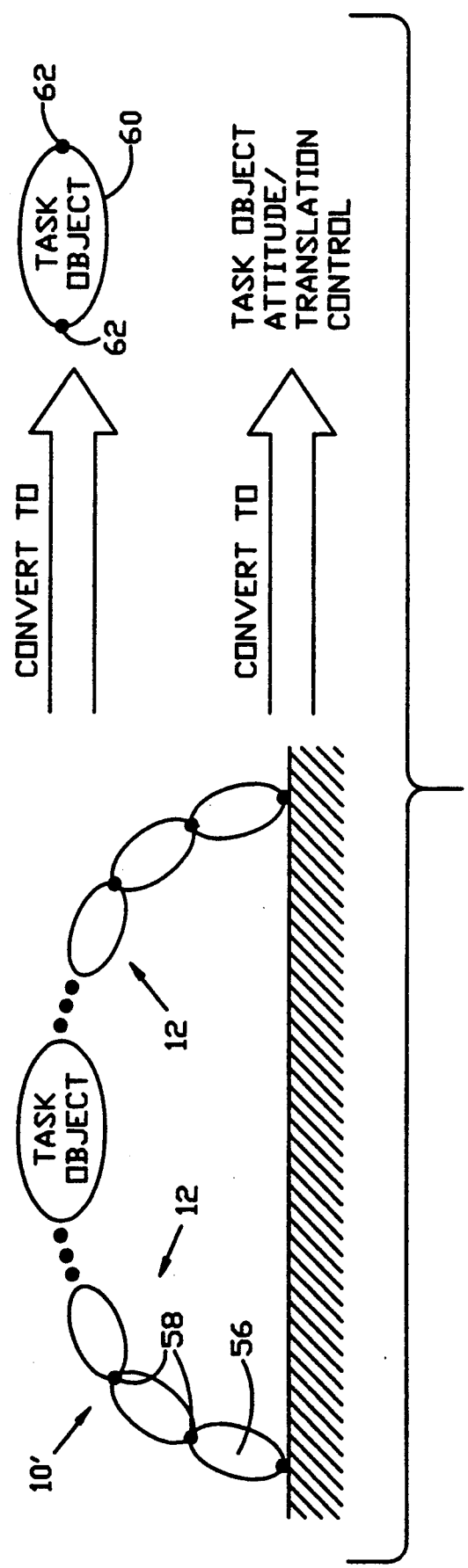
FIG. 13 is a functional diagram depicting how the capability of the present invention to allow inward recursion permits alternate approaches to solving robotics problems not possible with the prior art approaches.
Figure 14:
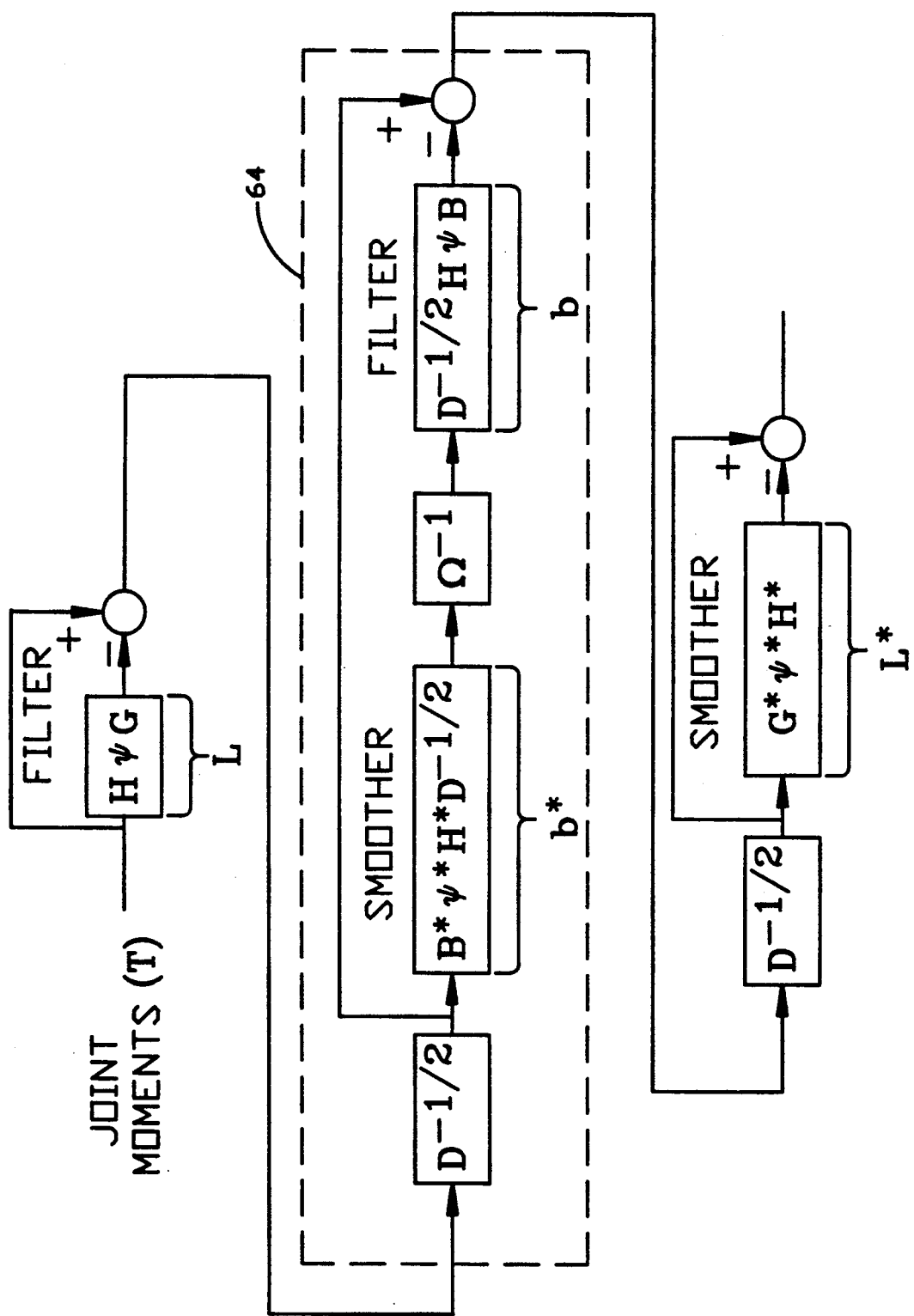
FIG. 14 is the block diagram of a robotic function stated in the spatial operator algebra of the present invention of FIG. 10 showing how the approach of the present invention allows portions to be easily removed so as to dynamically reconfigure the problem being solved or obtain necessary information.

Another benefit of the modular approach to robotic control and manipulation of the present invention which may not be readily apparent is depicted in FIG. 14. Given the problem described above with respect to FIG. 13, simple editing, as represented by the dashed box 64, can be used to detach the task object 60 from the arms 12. This, of course, can even take place dynamically at run time.

Returning once again to the overall system block diagram of FIG. 7, additional features of the system 42 of the present invention in its preferred embodiment will now be described. The run-time instruction sequence to be executed is input to the control computer 28. This is, of course, accomplished in the usual manner for object code and is shown symbolically as an input arrow for convenience and simplicity only. The computer run-time package portion of the system 42 of the present invention includes a simulation sequencer 66. Using the input run-time instruction sequence and supported by the spatial operator algebra definitions 68 and robot & environmental definition information 70, the simulation sequencer 66 first performs each anticipated move in a simulation mode to see if the probability is good that the operation will produce the desired effect. If an interposed object is in a proposed trajectory in the manner of FIG. 4, a new trajectory can be constructed. This is accomplished by the reconfiguration logic 72. This is a very important and novel aspect of the system 42 of this invention. The robot & environmental definition information 70 contains necessary information and parameters required to perform the spatial operator algebra at run time. Note that the robot & environmental definition information 70 has provision for dynamic input. Thus, when a component of the controlled robot is changed in a manner which will effect its operation, the new information is inserted by the robot operator/repairman into the robot & environmental definition information 70. On-line electronic/optical scanning and/or sensing apparatus can search the field of movement of the robot for the intrusion of interfering objects and insert such information into the robot & environmental definition information 70. In this manner, the controlled robot is best able to cope with changes in its personal and environmental conditions and best achieve the objectives for which is was installed. No prior art robotic control system has such a capability. Of course, when the simulated sequence is determined by the simulation sequencer to achieve the desired objectives to a satisfactory level, the run-time instruction sequence in its acceptable form is then passed to the execution sequencer 74 for actual execution and output of control signals to the controlled robot.

Working Example

One exemplary implementation of the invention will now be described with reference to FIG. 17. A user who is acquainted only with the simple high level operator language of the invention uses a computer 66 (such as a PC or work station) to enter a sequence of high level language statements into a robot 68. This sequence unambiguously defines a desired robot system or architecture. The sequence of high level language statements is stored in a buffer memory 70.

Figure 12:
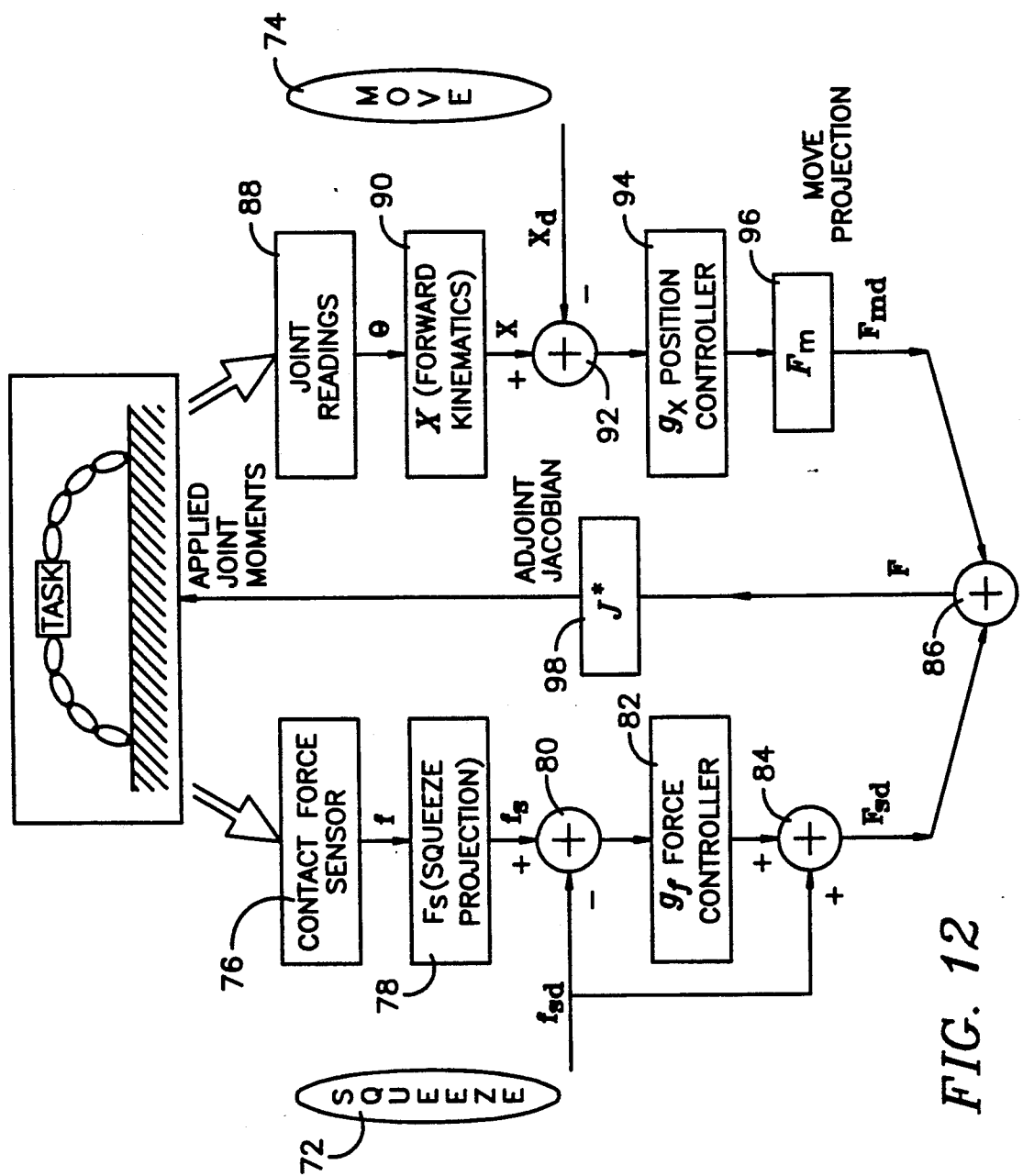
FIG. 12 is a functional block diagram showing how two applications language functions such as SQUEEZE and MOVE can be implemented using the spatial operator algebra of the present invention.

In the present example, the contents of the memory 70 corresponds to FIG. 12. The example of FIG. 12 was selected for tutorial purposes as one of the simplest robots capable of performing work on an object. The task performed by the robot of FIG. 12 is that of simultaneously moving and squeezing an object that is being handled by a two-arm robotic mechanism. Such an operation would occur for example in transporting bulky or irregularly shaped objects. The technical challenge is to move the object precisely while at the same time applying very precise force distributions and internal stresses on the object. Handling of fragile glasses is another example of a task requiring simultaneous move and squeeze operations.

The task begins with a command issued by the user, or by a higher-level user interface, to MOVE (72) to a desired position $x_d$ and to SQUEEZE (74) the object with a desired squeeze force $f_{sd}$. Based upon sensor readings obtained from a contact force sensor 76 and a squeeze projection operator $F_s$ (78) corresponding to a high level language statement, a comparison 80 is made between the actual sensed force and the desired force $f_{sd}$, and the difference is applied to a force controller 82 characterized by a gain $g_f$ whose output is summed (84) with the desired squeeze force $f_{sd}$ and applied to a sum 86. Simultaneously, based upon sensor readings obtained from position sensors 88 of the angular position $\theta$ of each robot joint and a forward kinematics operator X (90), a comparison 92 is made between the actual position x of each robot joint and the desired position $x_d$, and the difference is applied to a position controller 94 characterized by a gain $g_x$. The output of the position controller 94 is transformed by a move projection operator $F_m$ (96) whose output is applied to the sum 86. The output of the sum 86 is transformed by an adjoint Jacobian operator $J^*$ (98) whose output is a vector $\tau$ defining the joint moments applied to the robot joints. The foregoing may be summarized by the following high level language expression, of the type which the user would enter at the user input 66:

$$\tau = J^*\{g_f[F_s f - f_{sd}] + f_{sd} + F_m g_x[X(\theta) - x_d]\}. \tag{1}$$

The foregoing expression, defining the applied robot joint moments, is a mixture in the sense that it simultaneously commands and regulates the desired MOVE operations and the desired SQUEEZE operations. Two independent controllers 82, 94 are required, one (82) being capable of squeezing the object but not moving it and the other (94) being capable of moving the object but not squeezing it.

Figure 17:
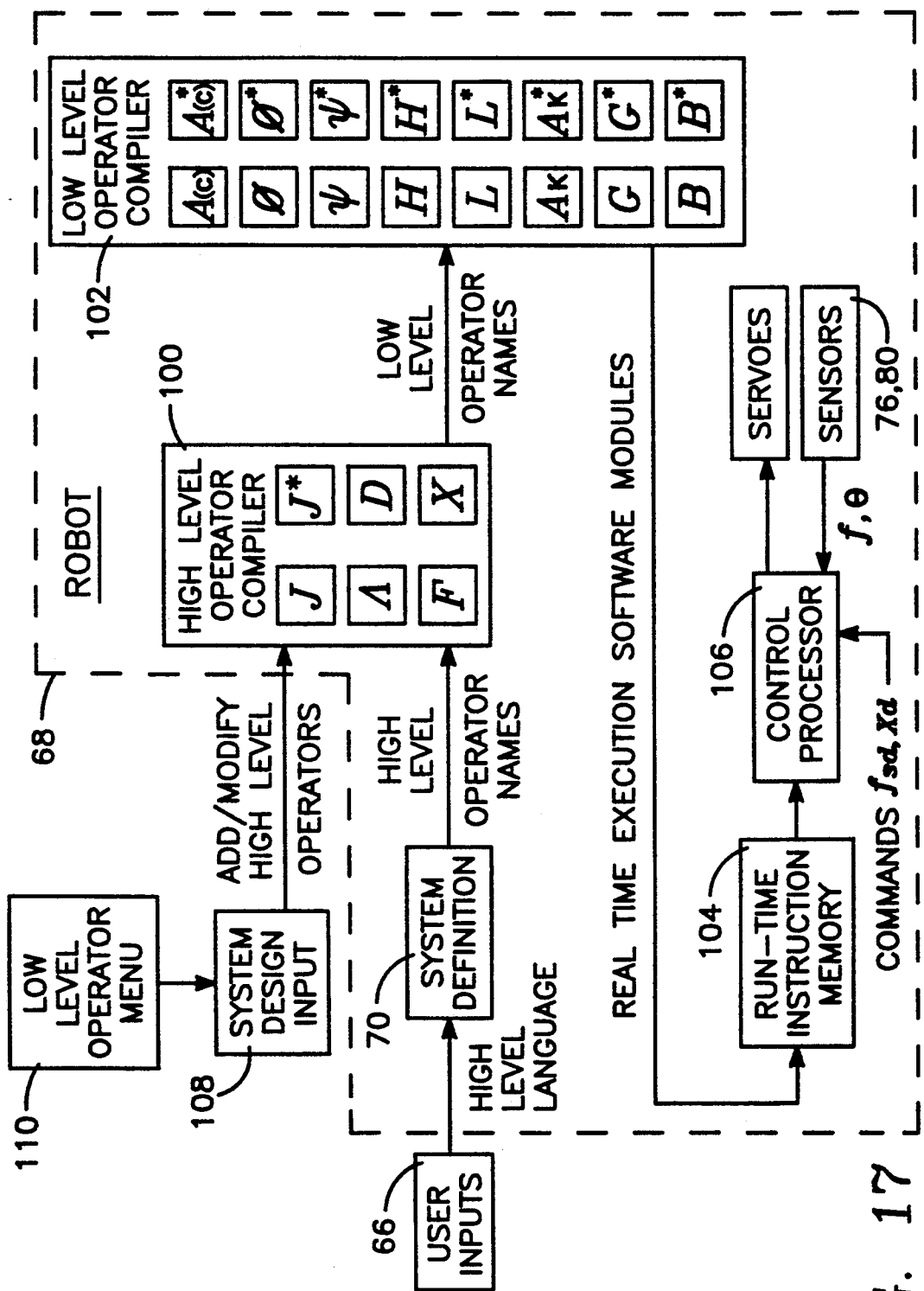
FIG. 17 is a block diagram of a robot embodying the invention and illustrating the modular hierarchy of high level and low level operators.

The high level language statement in the sequence stored in the memory 68 is transmitted as a sequence of parameters (f, $f_{sd}$, $g_f$, $\theta$, $x_d$, $g_x$) and high level operators ($F_s$, $F_m$, X and $J^*$) to a high level compiler 100 shown in FIG. 17 (corresponding to the first level compiler 52 of FIG. 7). The high level compiler 100 translates each one of the high level operators in the statement into the appropriate sequence of low level operators. As shown in FIG. 17, the high level compiler 100 contains low level operator sequences for each one of the high level operators $F_s$, $F_m$, X and $J^*$ employed in the system definition illustrated in FIG. 12 This feature will be described below in greater detail with reference to FIGS. 18-23. The high level operators shown inside the high level compiler 100 of FIG. 17 comprise a minimum set of high level operators sufficient to construct a robot capable of performing work on an object, and are a relatively small subset of a more complete set tabulated in FIG. 24.

Continuing the description of FIG. 17, the high level compiler 100 transmits each sequence of low level operators to a low level compiler 102 (corresponding to the second level compiler 54 of FIG. 7). The low level compiler 102 translates each low level operator received from the high level compiler 100 to the appropriate sequence of real time execution software modules. Each real time execution software module corresponds to a sequence of assembly language arithmetic instructions. As illustrated in FIG. 17, the low level compiler 102 contains real time execution software module sequences for each one of a complete set of low level operators. The low level operators shown inside the low level compiler 102 of FIG. 17 comprise a complete set for implementing almost any type of robot operation and architecture. Significantly, all of them are required to implement even the extremely simple robot architecture of present example of FIG. 12.

The real time execution software modules in each sequence adduced by the low level compiler 102 for each low level operator are transmitted to a run time instruction memory 104 of a control processor 106. The processor 106 sequentially fetches the real time execution software modules from the memory 104 and compiles each one of the real time execution software modules into a corresponding sequence of assembly language arithmetic instructions. It then executes the arithmetic instructions employing the parameters f, $f_{sd}$, $g_f$, $\theta$, $x_d$, $g_x$ as operands in accordance with the now thrice compiled version of the original statement of Eqn. (1). Some of the parameters (i.e., $g_f$ and $g_x$) are constants obtained from the design specifications of the robot 68 and are simply stored in the memory 104 prior to run time. The parameters f and $\theta$ are received by the processor 106 from the sensors 76, 88 on the robot 68 while the parameters $f_{sd}$ and $x_d$ are received by the processor 106 as the squeeze and move commands 72 and 74. Since the real time execution software modules stored in the memory 104 are directly translated by the processor 106 to arithmetic instructions, the terms "real time execution software module" and "arithmetic instruction" may be used interchangeably hereinafter.

Each of the low level operators 102 shown inside the low level compiler 102 of FIG. 17 has been previously defined in publications by the inventors herein, including Guillermo Rodriguez et al., "A Spatial Operator Algebra for Manipulator Modeling and Control," *International Journal of Robotics Research*, Aug. 1991 (referred to hereinafter as "publication 1"), Guillermo Rodriguez, "Recursive Forward Dynamics for Multiple Robot Arms Moving a Common Task Object," *IEEE Transactions on Robotics and Automation*, Vol. 5, No. 4, Aug. 1989, pp. 510–521 (referred to hereinafter as "publication 2"), Guillermo Rodriguez, "Kalman Filtering, Smoothing, and Recursive Robot Arm Forward and Inverse Dynamics," *IEEE Journal of Robotics and Automation*, Vol. RA-3, No. 6, Dec. 1987, pp. 624–639 (referred to hereinafter as "publication 3") and Guillermo Rodriguez, "Random Field Estimation Approach to Robot Dynamics," *IEEE Transactions on Systems, Man and Cybernetics*, Vol. 20, No. 5, pp. 1081–1093 (referred to hereinafter as "publication 4"). For the sake of clarity, Table I below provides the citations to definitions or descriptions of each of the low level operators of the low level compiler 102 of FIG. 17. The "adjoint" (denoted by a *) of each operator listed in Table I is found by merely taking its complex conjugate.

TABLE I

| operator | publication | location |
|---|---|---|
| A(C) | 2 | p. 513, eqn. 11 |
| B pickoff projection | 1 | 4th page, line 2 |
| C point contact | 2 | p. 513, lines 26–40 |
| G Kalman gain | 1 | 8th page, line 4 |
| G(k) | 3 | p. 630, eqn. 39 |
| H(k) | 1 | 3rd page, line 13 |
| H joint axis projection | 1 | 4th page, line 1 |
| L | 4 | p. 1088, line 34–35 |
| M | 1 | 5th page, line 14 |
| M(k) | 1 | 5th page, line 17 |
| P(k) | 3 | p. 630, eqn. 43 |
| $\phi$(k,k-1) | 1 | 3rd page, line 15 |
| $\phi$ | 1 | 4th page, line 3 |
| $\psi$(k,k-1) | 1 | 8th page, eqn. 4.2 |
| $\psi$ | 1 | 9th page, line 3 |
| $A_k$ coordinate transform | 3 | p 628, cl 2, ln 17–27 |

CONNECTING MODULAR BUILDING BLOCKS OF LOW LEVEL OPERATORS TO FORM HIGH LEVEL OPERATORS

The foregoing low level operators form a library of components of which an unlimited number of copies may be made and connected together like modular building blocks in many different ways to form different high level operators that the system designer may need. For this purpose, a system designer input 108 may be used to name and then define a new high level operator to the high level operator compiler 100. The system designer input 108 refers to a menu 110 of the complete set of low level operators (corresponding to Table I) which the system designer may select as building blocks to be connected together in various combinations to form new high level operators. The system designer input 108 is used to specify these connections, thereby defining the named high level operator whose definition is then stored in the high level compiler 100. This feature may be used to expand the high level operator language of the invention.

Each high level operator generally consists of a number of levels of operations, each level providing results used in carrying out the operations of the next highest level. Usually, there are seven levels in each high level operator. Generally, each low level operator always occurs, if at all, in a particular one of the seven levels, as follows:

7th Level

The link coordinate transform operator $A(\theta_k)$ generally occurs in the beginning (seventh) level and transforms the coordinates to the frame of reference of a current (kth) link. This operation is carried out individually for each link in a robot member or arm.

6th Level

Operators used in cross link and cross joint operations such as $\phi(k,k-1)$, $\phi^*(k,k-1)$, $H(k)$, $H^*(k)$, $G(k)$ and $G^*(k)$ generally occur in the next (sixth) level and are carried out for each link individually.

5th Level

Operations carried out at the sixth level provide operators residing at the next highest (fifth) level, such as the intrabody propagation operators $\psi(k,k-1)$ and $\psi^*(k,k-1)$, which are computed individually for all links/joints.

4th Level

The fourth level generally consists of inward or outward recursions of the propagation operators, usually comprising a sum of a certain propagation operator over all previous links.

3rd Level

The sum carried out in the 4th level provides one of a group of "global" operators, such as the Kalman transition operator $\psi$, for the next highest (third) level. This group of operators also includes the "global" operators such as H, G, D and/or B. These operators are "global" in the sense that they represent computations for all links k=1 through N.

2nd Level

The operators adduced in the 3rd level are combined in the second level, implementing Kalman filter processes in those cases in which the cross-joint operation of Level 6 is a true transformation and not simply an identity matrix. The Kalman filter operations correspond to recursions across plural robot links for a given discrete (constant) point in time. (In contrast, most prior art applications of Kalman filters perform recursions across many discrete points in time.) For those cases in which the cross-joint operation of Level 6 is merely an identity matrix, there is no "true" cross-joint operation, and the resulting recursion operation at Level 5 is that of a degenerate Kalman filter so that no Kalman prediction update is performed in Level 2. Reference is hereby made to the description of the foregoing type of Kalman filter process described at page 630 of publication 3 referred to in Table I. As described therein, each iteration of the Kalman filter provides additional components such as G(k) of global operators such as the Kalman gain G.

1st Level

The 2nd level provides the final result of the current iteration of the first level.

The foregoing seven levels of operations are carried out starting with a first iteration of Levels 1 through 7 at a first discrete point in robot operation time to produce a result at Level 1, then a second iteration of Levels 1 through 7 at the next discrete point in time using the results obtained in the previous iteration to produce a next result at the Level 1, and so forth.

How to form each of the high level operators as modular combinations of low level operators in a seven level architecture will now be described for each of the high level operators required in the robot of FIG. 12.

Inverse Jacobian Operator $J^{-1}$

Figure 18:
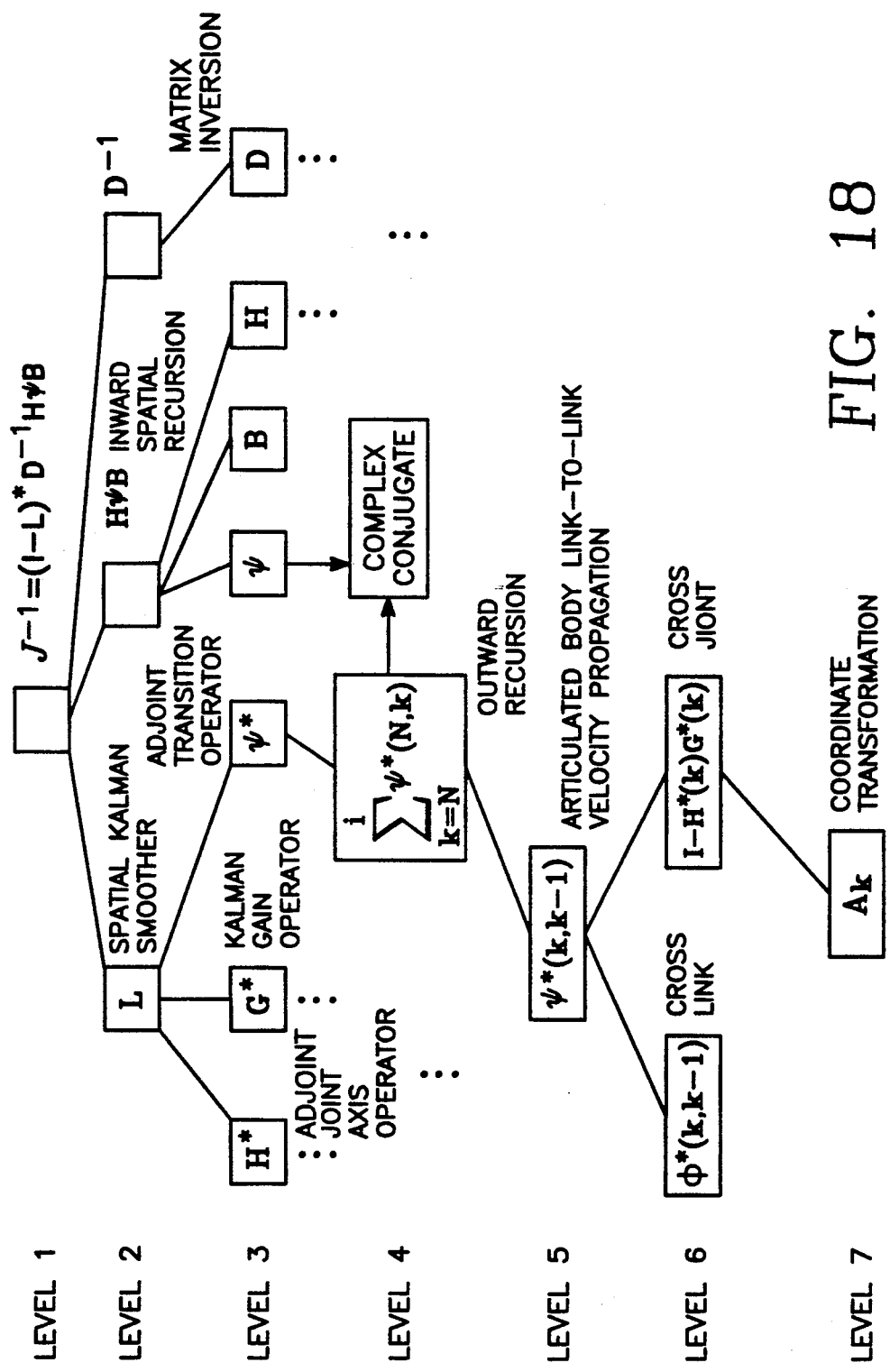
FIGS. 18 through 24 are block diagrams of respective high level operators each modularly assembled in seven levels of low level operators.

The modular assembly of independent low level operators comprising the inverse Jacobian operator $J^{-1}$ is illustrated in FIG. 18. Referring to FIG. 18, level 7 consists of a coordinate transformation $A_k$ to the frame of reference of the current (kth) link. This is followed by level 6 consisting of an adjoint cross-link operator $\phi^*(k+1,k)$ and an adjoint cross-joint operation $I-H^*(k)G^*(k)$, whose results are combined in the next level, level 5, to produce the adjoint link-to-link operator $\psi^*(k,k-1)$. Such adjoint link-to-link propagators obtained in all previous iterations are summed in the outward recursion of level 4 to produce the adjoint Kalman transition operator $\psi^*$ of level 3 and its complex conjugate $\psi$. Level 3 also comprises the pickoff operator B, the Kalman gain adjoint operator $G^*$ (adduced from the $G^*(k)$ of all previous iterations in accordance with Table I) and the joint axis unit vector adjoint operator $H^*$ (adduced from the $H^*(k)$ of all previous iterations in accordance with Table I). As indicated in FIG. 18, Level 3 also comprises the spatial articulated inertia D, which is another high level operator compiled in a similar seven-level architecture and will be described below with reference to FIG. 21. Level 3 further comprises the Kalman transition operator $\psi$ which is derived from the outward recursion of level 4 through a conventional complex conjugate operation. Level 2 consists of several complex operations operating on various elements obtained in Level 3: a spatial Kalman smoother $G^*\psi^*H^*$ generates $L^*$ in accordance with the definition of L referenced in Table I; an inward recursion $H\psi B$ is performed; and, the inverse articulated inertia $D^{-1}$ is computed by simply taking the matrix inverse of D. Level 1 combines the results obtained in level 2 to produce the inverse Jacobian operator $J^{-1}$ as $(I-L^*)D^{-1}HB\psi$.

Jacobian Operator J

Figure 19:
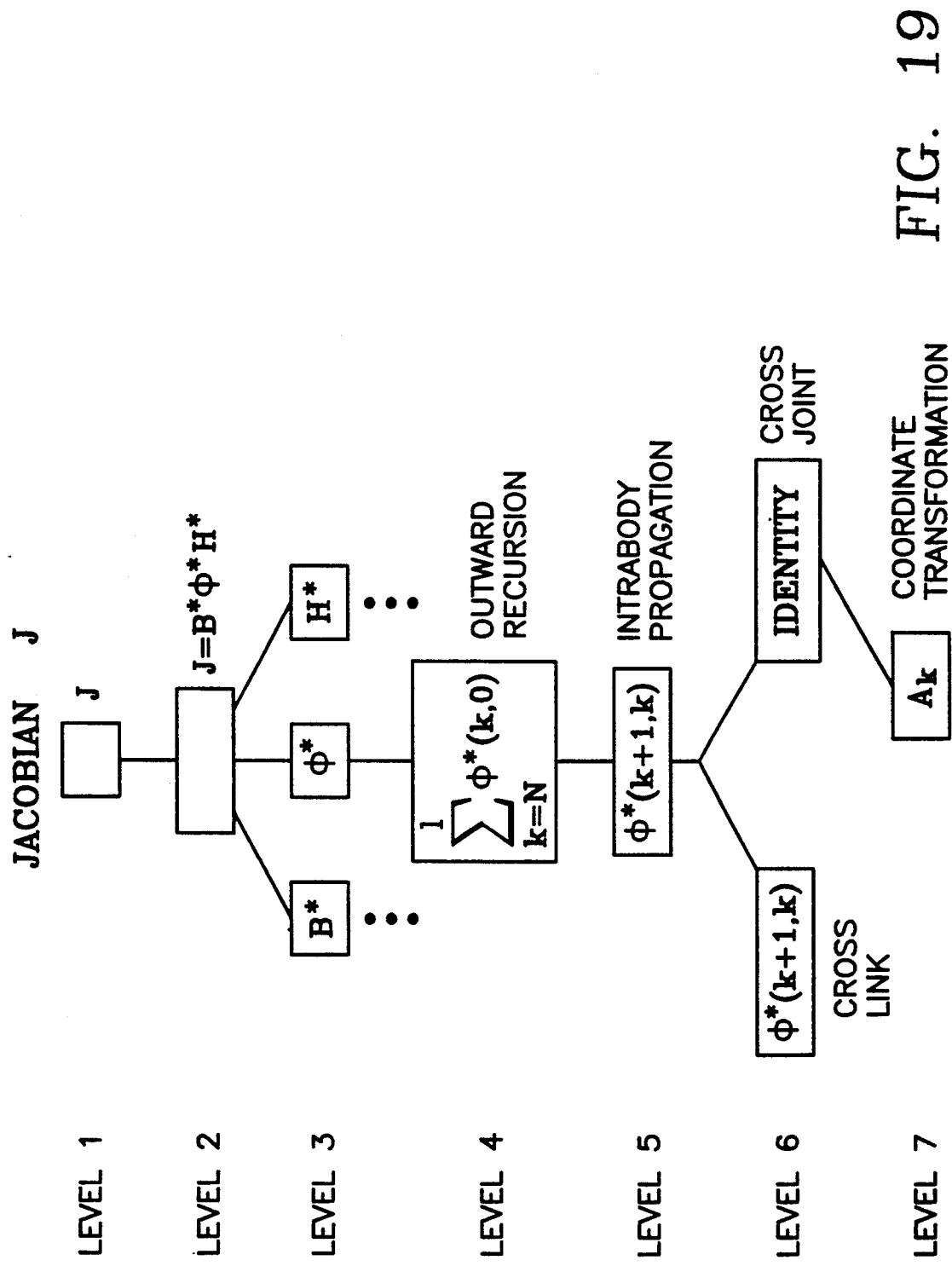

The modular assembly of independent low level operators comprising the Jacobian operator J is illustrated in FIG. 19. Referring to FIG. 19, level 7 consists of a coordinate transformation $A_k$ 112. This is followed by level 6 consisting of an adjoint cross link operator $\phi^*(k+1,k)$. There is no cross joint operation. Thus, the operator $\phi^*(k+1,k)$ of level 6 is passed unchanged onto level 5 as an intrabody propagator. Level 4 performs an outward recursion by summing all intrabody propagators to generate a transition operator $\phi^*$, which is assembled at level 3 with the adjoint pickoff operator $B^*$ and the adjoint joint axis operator $H^*$. These operators are combined in level 2 as $B^*\phi^*H^*$ to generate the Jacobian operator J at level 1.

Operational Space Inertia $\Lambda$

Figure 20:
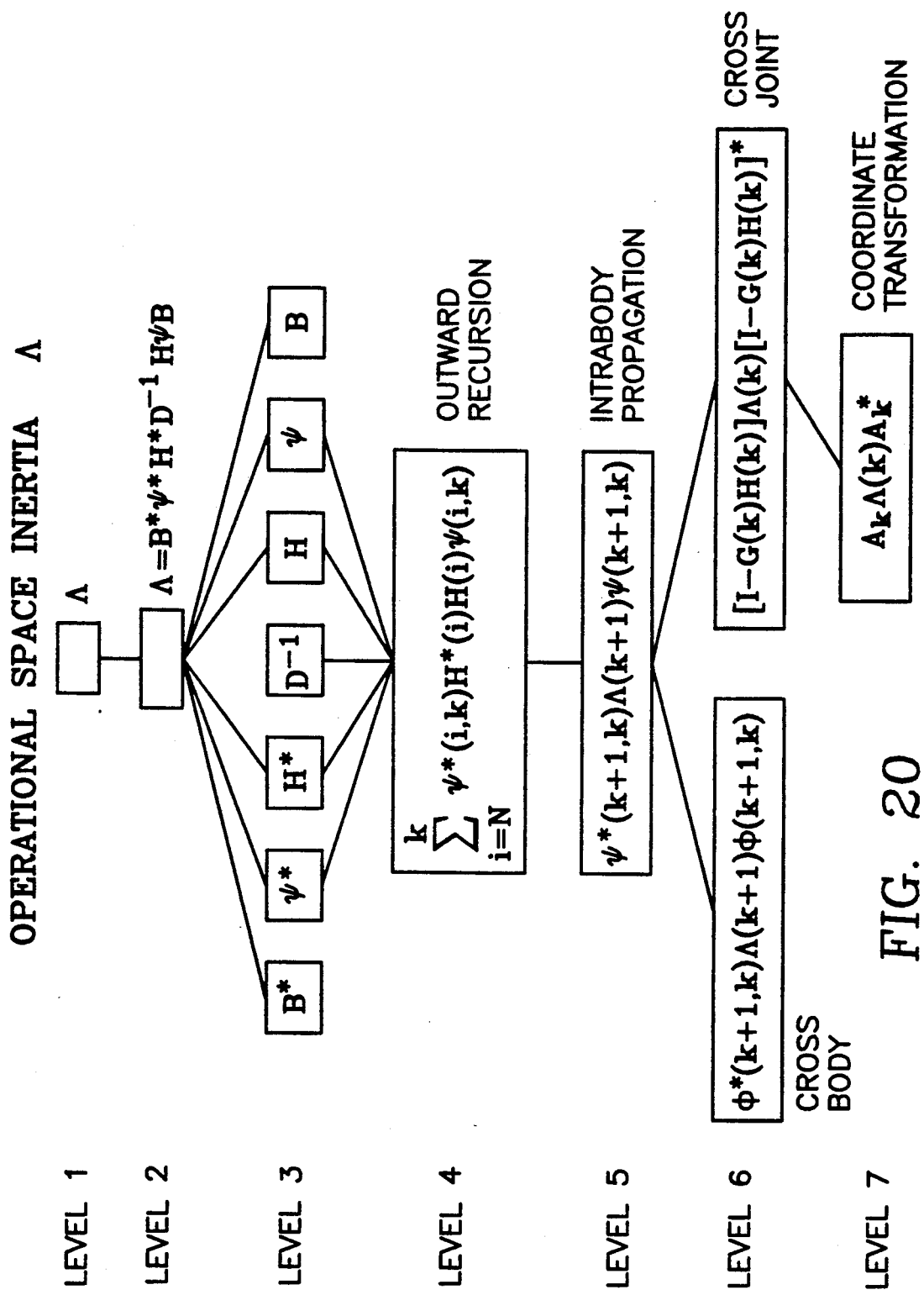

The seven level modular assembly comprising the operational space inertia A is illustrated in FIG. 20 and is analogous to the inverse Jacobian $J^{-1}$ of FIG. 18. One difference is that the cross-link operation of Level 6 employs the operational space inertia $\Lambda$ obtained at Level 1 during the previous iteration. The cross-joint operation of Level 6 is also different from that of FIG. 18 in that it employs an additional term, $[I-G(k)H(k)]$. The operator $D^{-1}$ is obtained by taking the inverse of the operator D as in FIG. 18. Level 2 performs only one computation: $B^*\psi^*H^*D^{-1}H\psi B=\Lambda$.

Articulated Inertia D

Figure 21:
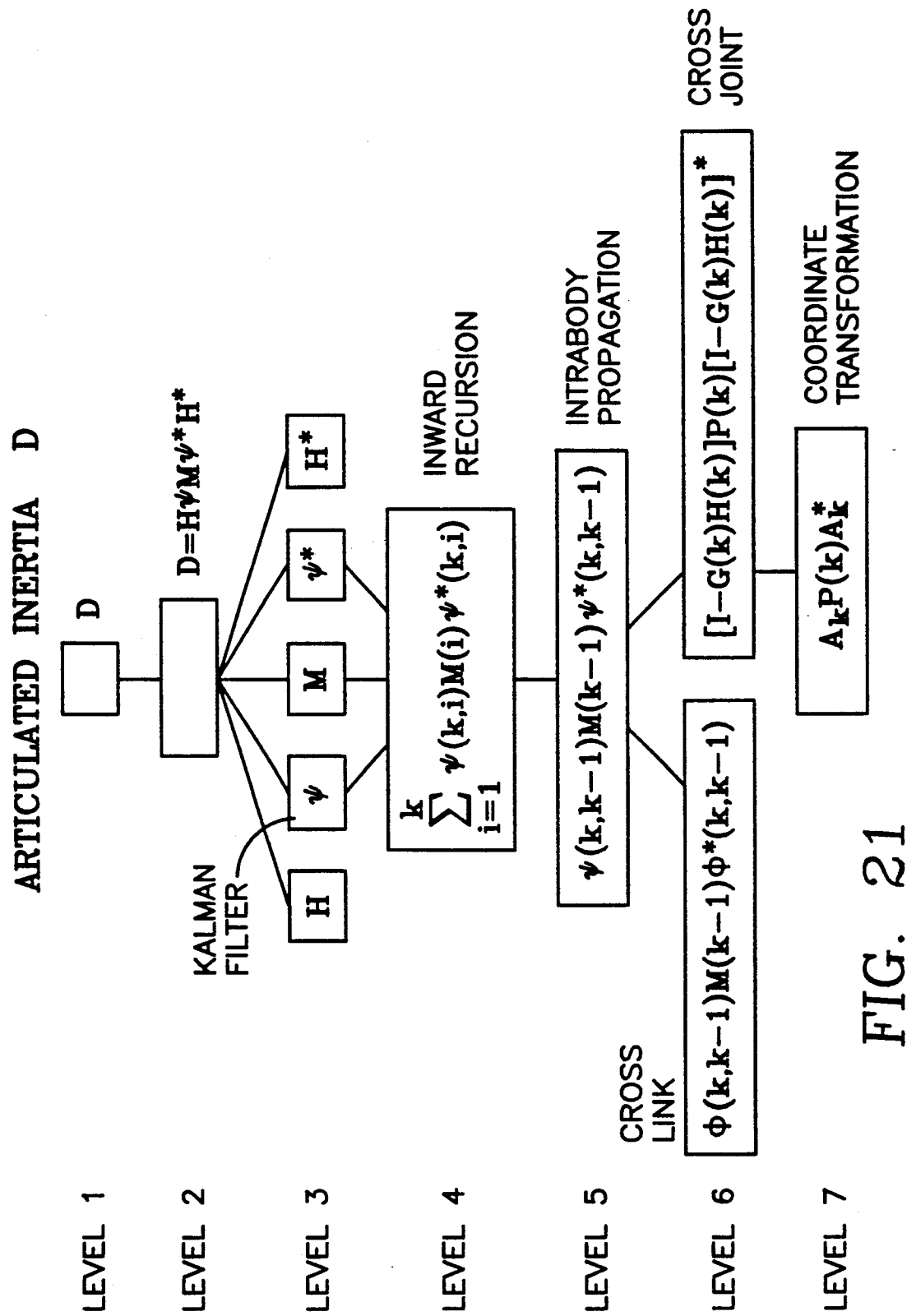

The seven level modular assembly comprising the articulated inertia D is illustrated in FIG. 21 and is analogous to the operational space inertia $\Lambda$ of FIG. 20. Level 7 consists of a projection of the Kalman filter updated version of P(k) (whose definition is referenced in Table I) by the coordinate transformation operator $A_k$. Level 6 then projects the version of P(k) generated in Level 7 in accordance with the cross-joint operator $[I-G(k)H(k)]$. Level 6 also projects the spatial inertia M(k) in accordance with the cross-link operation $\phi(k,k-1)$. Combining the cross-link and cross-joint operations of Level 6 produces the intrabody propagation of Level 5, upon which an inward recursion is performed in Level 4. The resulting operator at Level 3 is projected upon H in Level 2 to produce the articulated inertia D at Level 1. The articulated inertia operator D is also described at line 4, 8th page of publication 1. The component of D for a given (kth) iteration, namely D(k), is defined by equation 38 on page 630 of publication 3.

Squeeze Force Projection $F_s$

Figure 22:
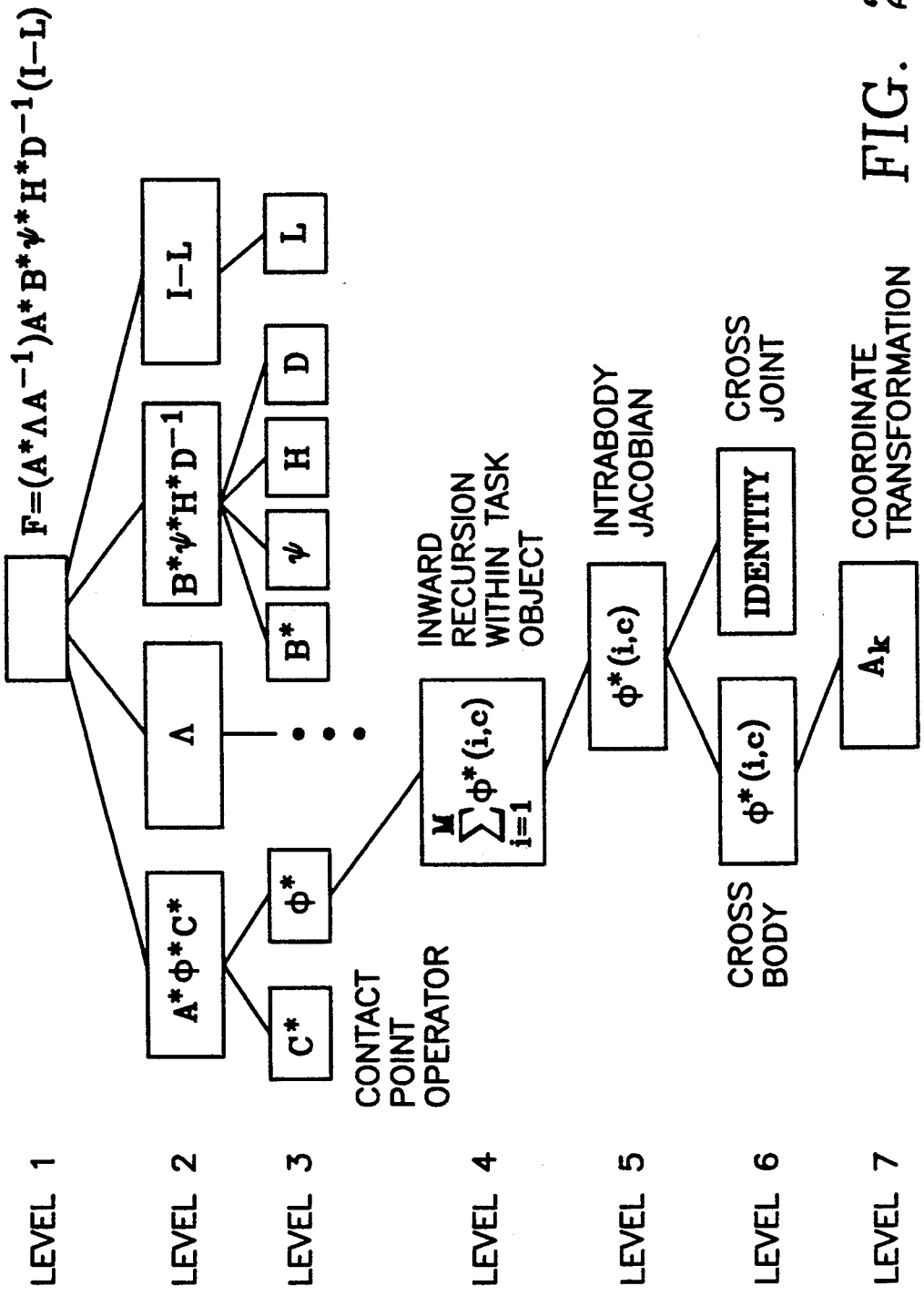

The seven level modular assembly comprising the squeeze force projection operator $F_s$ is illustrated in FIG. 22. Levels 7 through 3 thereof are highly analogous to those of FIG. 19, except that the reference is always to the task object contact point operator C. As a result, the inward recursion of Level 4 is carried out at points on or in the task object. Level 3 requires a contact point operator C to generate the squeeze operator A(C) of Level 2. Level 3 also requires the adjoint Kalman transition operator $\psi^*$ whose compilation consists of levels 7 through 4 of FIG. 18, it being understood that this compilation is also present in FIG. 22. $\psi^*$ is obtained by taking the complex conjugate of $\psi$ as in FIG. 18. Level 2 produces the squeeze operator $A^*(C)=\phi^*C^*$, the operational space inertia $\Lambda$ of FIG. 20, a Kalman smoothing operation $\psi^*H^*D^{-1}$ and a filtering operation $(I-L)$. $D^{-1}$ is obtained by taking the matrix inverse of D as in FIG. 18. The operator $L^*$ is obtained at level 2 from $H^*$, $G^*$ and $\psi$ in accordance with the definition of L referred to in Table I as in FIG. 18. The operation of Level 1 is self-explanatory and employs the operational space inertia of FIG. 20 as one building block.

Forward Kinematics X

Figure 23:
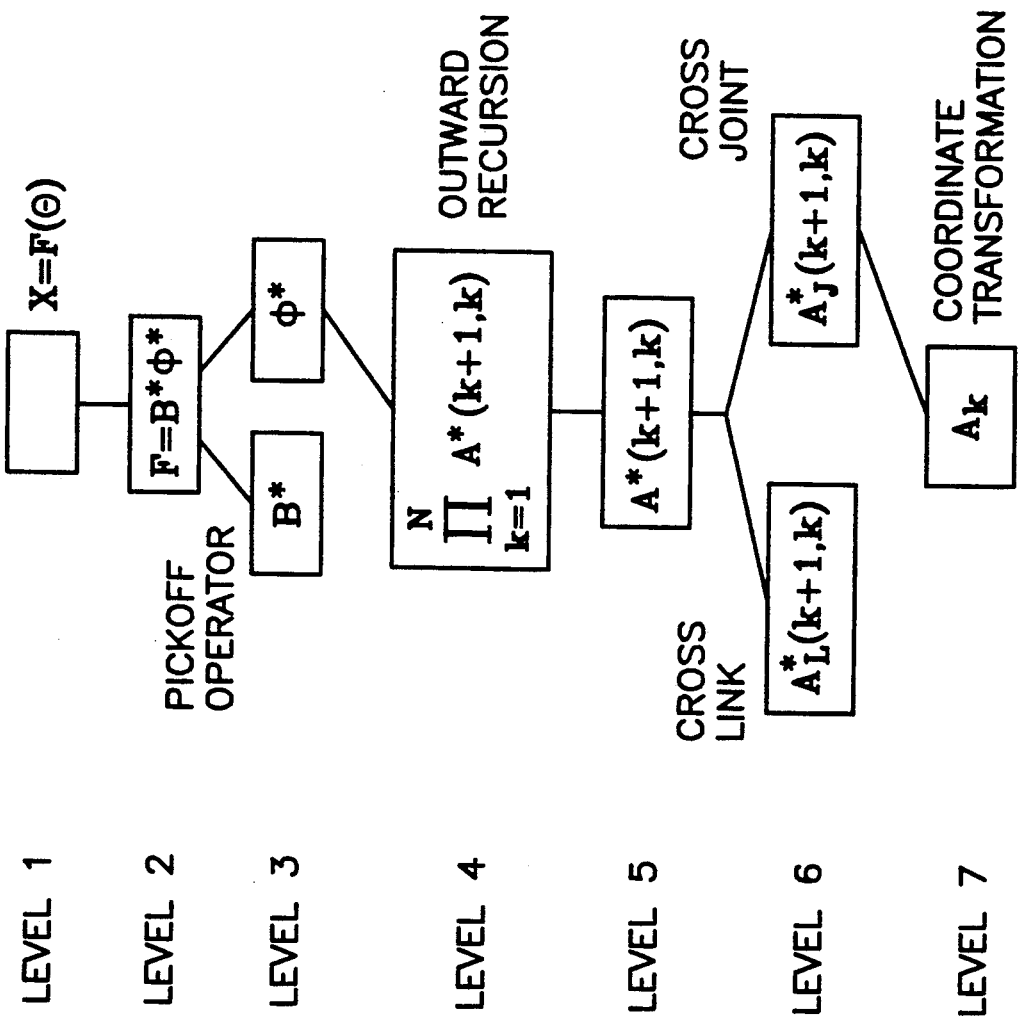

The seven level modular building block assembly of low level operators comprising the forward kinematics operator X is illustrated in FIG. 23. This structure is closely analogous to the structure of the Jacobian operator J illustrated in FIG. 19, the major difference being that coordinate transformations $A_L$ and $A_J$ are employed in lieu of the propagation operator $\phi$ in Level 6. The cross-link transformation $A_L$ performs a transformation from the frame of reference of the previous (k+1st) link to the frame of reference of the next (kth) link, and is a straightforward function of the robot configuration. The cross-joint transformation $A_J$ performs a transformation from one side of the current (kth) joint to the other side of the current joint and is also a straightforward function of the robot configuration. These two transformations are combined in Level 5 in a combined transformation. The combined transformations thus adduced at Level 5 during all previous iterations are multiplied together in the outward recursion of Level 4 to form the operator $\phi$ at Level 3. This latter operator is combined with the pickoff operator B at Level 2 to form the forward kinematics operator X at Level 1.

Move Projection Operator $F_m$

Figure 24:
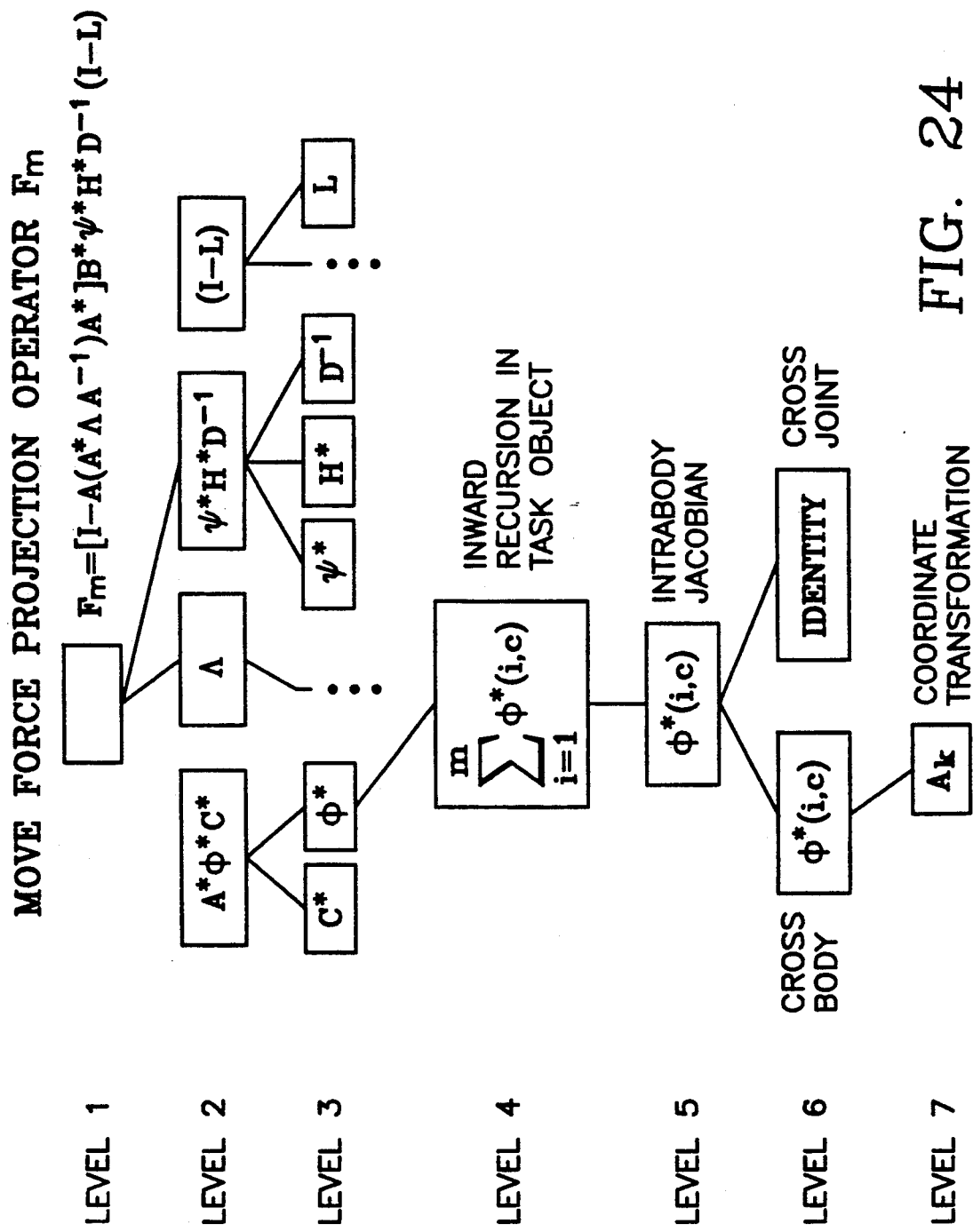

Referring to FIG. 24, the individual operations at each one of the seven levels comprising the compilation of the move projection operator $F_m$ have been described above with reference to respective ones of FIGS. 18-23.

Other high level operators may be formed to enhance the versatility of the high level operator language of the invention. FIG. 25 illustrates a table of high level operators which may be formed using the seven level architecture discussed herein. In FIG. 25, a high level operator name with a numeral indicates that the high level operator is useful in designing robots which perform no work on a task object and a high level operator name with a numeral 2 indicates that the high level operator is useful in designing robots which perform work (such as squeezing or pushing) on a task object. A potentially unlimited number of other high level operators may be formulated in the future to improve the efficiency and versatility of the high level operator robot language of the invention.

LINEARIZED RECURSIVE HIGH LEVEL OPERATORS

Figure 26:
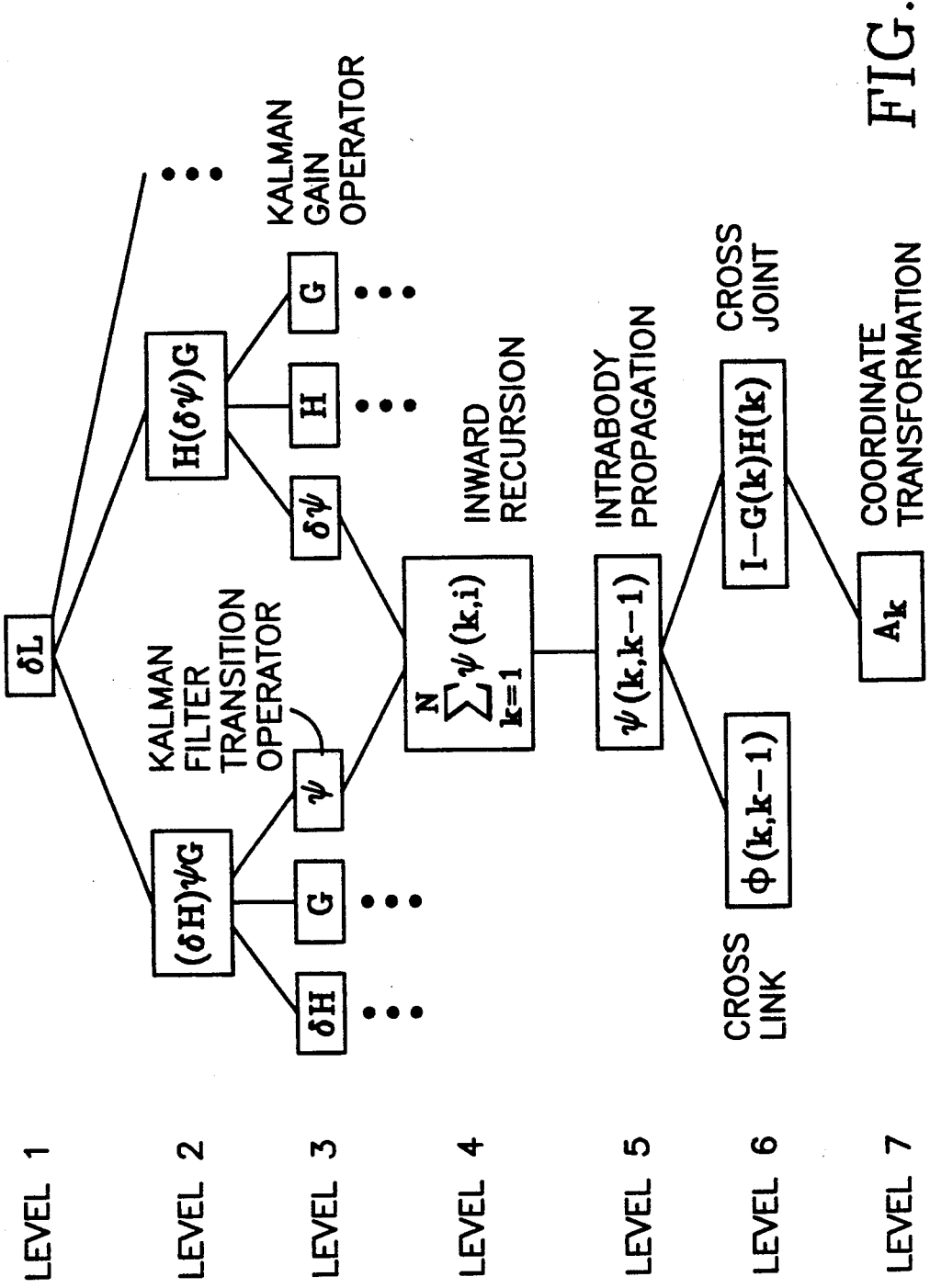
FIG. 26 is a block diagram of a modular high level operator for linearized dynamic robotic models.

One additional high level operator that has been recently introduced is illustrated in FIG. 26. The high level operator of FIG. 26 is a linearized dynamic operator which permits the user to specify a linearized dynamic robot model. Linearized robot dynamic models are particularly useful, for example, in controlling robot motion with respect to some pre-determined trajectory. In this application, control commands are computed with respect to small deviations of the actual robot motions from the pre-determined trajectory. A conventional variational technique is followed in linearized robot dynamics models which employs the partial derivative of a given operator with respect to its parameters in order to compute the variation from a nominal state or trajectory. The implementation of linearized robot dynamics models using the spatial operator algebra of the present invention is disclosed by A. Jain and G. Rodriguez, "Recursive Linearization of Manipulator Dynamics Models," *Proceedings the IEEE Conference on Systems, Man and Cybernetics*, Nov. 4, 1990. In the following description, the $\delta$ symbol preceding an operator denotes the partial derivative of that operator with respect to each parameter (e.g., $\theta$, $\dot\theta$) of the operator. It is a discovery of the invention that, in general, such partial derivatives of high level operators of the type referred to in the table of FIG. 25 are closed form expressions and are therefore susceptible of straightforward computation and use.

It is a further discovery of the invention that high level operators of invention which are required to implement linearized robot dynamic models are easily constructed by simply copying the bottom four levels (i.e., Levels 7, 6, 5, 4) of operators previously described herein, for example. Thus, only the top levels (i.e., Levels 3, 2, 1) need be customized or generated, greatly simplifying the task of generating such an operator. The operator of FIG. 26 is $\delta L$, which is the partial derivative of the operator L (whose definition is referred to in Table I) with respect to $\theta$, and is useful in implementing the linearized robot dynamics described above. FIG. 26 indicates that $\delta L$ is a seven level modular assembly of low level operator building blocks, as is the case with all other high level operators described previously herein with respect to FIGS. 18-23. The bottom four levels (i.e., levels 7, 6, 5 and 4) of the $\delta L$ operator of FIG. 26 are virtually identical (with the exception of a complex conjugate) to the bottom four levels of the inverse Jacobian $J^{-1}$ previously described herein with reference to FIG. 18 and therefore may be copied directly therefrom.

Level 3 of the $\delta L$ operator of FIG. 26 provides the low level operators G, H and the partial derivative of H, namely $\delta H$. The inward recursion of Level 4 provides the Kalman transition operator $\psi$ for Level 3. A partial derivative of $\psi$ produces $\delta\psi$ at Level 3. Level 2 combines $\delta H$, G and $\psi$ in a first operation and H, $\delta\psi$ and G in a second parallel operation. Level 1 combines the results of the two operations to produce the linearized dynamic operator $\delta L$. The application of this type of operator to linearized robot dynamics is described in A. Jain and G. Rodriguez, "Recursive Linearization of Manipulator Dynamics Models," *Proceedings of the IEEE Conference on Systems, Man and Cybernetics*, Nov. 4, 1990.

Wherefore, having thus described our invention, what is claimed is:

1. A high level language-based control system for a robot which performs a set of movement functions comprising:
    a) a digital control computer operably connected to the robot to control the movement functions thereof, said digital control computer including program execution means for executing control programs;
    b) translator means for reading a set of robot control statement sequences and for generating control programs therefrom defining a set of robot control sequences, said translator means comprising:
       (1) first translator means for accepting as inputs thereto statements in a high level spatial operator algebra language and for outputting machine language sequences reflecting said inputs to said first translator means and executable by said digital control computer, and (2) second translator means for accepting as inputs thereto statements in a high level robot applications language and for outputting to said first translator means statements in said high level spatial operator algebra language reflecting said inputs to said second translator means;

c) means for inputting said control programs into said digital control computer for execution thereby; and d) robot computer simulation means operably connected to said digital control computer for executing said control programs in a simulation mode prior to executing them to control the robot and for preventing said digital control computer from executing said control programs to control the robot if a problem is detected in said simulation mode.

2. The high level language-based control system for a robot of claim 1 and additionally comprising:

reconfiguration means connected to said robot simulation means for reconfiguring said programs when problems exist in said simulation mode to a form in which no problems exist in said simulation mode before allowing said digital control computer to execute said programs to control the robot.

3. The high level language-based control system for a robot of claim 1 in which said robot operates in an environment, and additionally comprising:

robot and environmental definition means connected to said robot simulation means for holding and providing data about the robot and the environment in which the robot is working which is used to determined if problems exist in said simulation mode.

4. The high level language-based control system for a robot of claim 3 wherein:

said robot and environmental definition means includes means for dynamically changing said data about the robot and the environment in which the robot is working.

5. A high level language-based control system for a robot which performs a set of movement functions comprising:

a) a digital control computer operably connected to the robot to control the movement functions thereof, said digital control computer including program execution means for executing control programs;

b) means for inputting said control programs into said digital control computer for execution thereby; and c) translator means for reading a set of robot control statement sequences and for generating control programs therefrom defining a set of robot control sequences, said translator means comprising, c1) first translator means for accepting as inputs thereto statements in a high level spatial operator algebra language and for outputting machine language sequences reflecting said inputs to said first translator means and executable by said digital control computer, and c2) second translator means for accepting as inputs thereto statements in a high level robot applications language and for outputting to said first translator means statements in said high level spatial operator algebra language reflecting said inputs to said second translator means.

6. The high level language-based control system for a robot of claim 5 and additionally comprising:

robot simulation means operably connected to said digital control computer for executing said control programs in a simulation mode prior to executing them to control the robot and for preventing said digital control computer from executing said control programs to control the robot if a problem is detected in said simulation mode.

7. The high level language-based control system for a robot of claim 6 and additionally comprising:

reconfiguration means connected to said robot simulation means for reconfiguring said programs when problems exist in said simulation mode to a form in which no problems exist in said simulation mode before allowing said digital control computer to execute said programs to control the robot.

8. The high level language-based control system for a robot of claim 6 in which said robot works in an environment, and additionally comprising:

robot and environmental definition means connected to said robot simulation means for holding and providing data about the robot and the environment in which the robot is working which is used to determine if problems exist in said simulation mode.

9. The high level language-based control system for a robot of claim 8 wherein:

said robot and environmental definition means includes means for dynamically changing said data about the robot and the environment in which the robot is working.

10. The high level language-based control system for a robot of claim 5 wherein:

said first translator means includes embedded algorithms defining standard robot movements and actions whereby execution time of said machine language sequences is minimized.

11. In a computer-controlled robot having at least one gripping arm with a plurality of degrees of freedom for performing a set of movement functions wherein a digital control computer executing control programs contained therein is operably connected to the robot to control the movement functions thereof whereby said robot is a computer-controlled robot, an improvement for improving ease of programming the digital control computer and for improving operation of the robot comprising:

b) translator means for reading a set of robot control statement sequences and for generating control programs therefrom defining a set of robot control sequences, said translator means comprising:

a) translator means for reading a set of robot control statement sequences and for generating control programs for the digital control computer therefrom defining a set of robot control sequences, said translator means comprising:

(1) first translator means for accepting as inputs thereto statements in a high level spatial operator algebra language and for outputting machine language sequences reflecting said inputs to said first translator means and executable by said digital control computer, and (2) second translator means for accepting as inputs thereto statements in a high level robot applications language and for outputting said first translator means statements in said high level spatial operator algebra language reflecting said inputs to said second translator means;

b) means for inputting said control programs into the digital control computer for execution thereby; and c) robot simulation means operably connected to the digital control computer for executing said control programs in a fast simulation mode prior to executing them to control the robot and for preventing said digital control computer from executing said control programs to control the robot if a problem is detected in said simulation mode.

12. The improvement to a computer-controlled robot of claim 11 and additionally comprising:

reconfiguration means connected to said robot simulation means for reconfiguring said programs when problems exist in said simulation mode to a form in which no problems exist in said simulation mode before allowing the control computer to execute said programs to control the robot.

13. The improvement to a computer-controlled robot of claim 11 and additionally comprising:

robot and environmental definition means connected to said robot simulation means for holding and providing data about the robot and the environment in which the robot is working which is used to determine if problems exist in said simulation mode.

14. The improvement to a computer-controlled robot of claim 13 wherein:

said robot and environmental definition means includes means for dynamically changing said data about the robot and the environment in which the robot is working.

15. The improvement to a computer-controlled robot of claim 13 wherein:

said first translator means includes embedded algorithms defining standard robot movement and actions whereby execution time of said machine language sequences is minimized.

16. A high level language-based control system for programming and controlling a multiple-armed robot having multiple degrees of freedom for performing a set of movement functions, comprising:

a) a digital control computer operably connected to the multiple-armed robot to control the movement functions thereof, said digital control computer including program execution means for executing control programs;

b) means for inputting said control programs into said digital control computer for execution thereby; and c) translator means for reading a set of robot control statement sequences and for generating control programs therefrom defining a set of robot control sequences, said translator means comprising, c1) first translator means for accepting as inputs thereto statements in a high level spatial operator algebra language and for outputting machine language sequences reflecting said inputs to said first translator means and executable by said digital control computer, said first translator means including embedded algorithms defining standard robot movements and actions whereby execution time of said machine language sequences is minimized, and c2) second translator means for accepting as inputs thereto statements in a high level robot applications language comprising operators for standard robot movement of multiple arms moving in cooperation such as MOVE, SQUEEZE, GRIP and for outputting to said first translator means statements in said high level spatial operator algebra language reflecting said inputs to said second translator means.

17. A system for controlling a multi-link, multi-joint robot with a processor controlling joint servos and responsive to joint sensors for executing arithmetic instructions, said system comprising:

first compiler means for translating each one of a selected sequence of plural low level spatial operators to a corresponding sequence of arithmetic instructions and transmitting said sequence of arithmetic instructions to said processor, said set of said low level operators comprising a first type of operator for performing a coordinate transformation to a frame of reference of a current robot link, a second type of operator for propagating vector quantities across at least one of said current robot link and a corresponding robot joint, a third type of operator comprising a combination of operators of said second type, a fourth type of operator for performing a recursion of plural operators of said third type across plural robot links of a robot member, a fifth type of operator including operators produced from operators of said fourth type, and a sixth type of operator for combining operators of said fifth type;

second compiler means for translating each one of a set of plural high level operators to a corresponding sequence of at least some of said low level operators and transmitting said sequence of low level operators to said first compiler means as said selected sequence, said sequence of low level operators comprising plural iterations associated with plural discrete points in time, each iteration comprising a first, second, third, fourth, fifth and sixth levels comprising, respectively, low level operators of said first, second, third, fourth, fifth and sixth types, whereby each high level operator comprises a modular assembly of ones of said low level operators.

18. The system of claim 17 further comprising: robot architecture memory means for storing high level program statements in an order which includes said set of high level operators whereby to define a particular robot architecture, and for transmitting said statements to said second compiler in said order.

19. The system of claim 17 wherein fifth type of operator comprises a Kalman transition operator and said sixth type of operator comprises an operator which performs a Kalman filter operation in combining said operators of said fifth type.

20. The system of claim 19 wherein said Kalman filter provides a Kalman gain for each one of said links, and wherein said second type of operator which propagates vector quantities across a robot joint comprises the Kalman gain of said corresponding robot joint.

21. The system of claim 19 wherein said fifth type of operator further comprises a robot joint axis projection operator and a pickoff projection operator.

22. The system of claim 21 wherein the sequence of low level operators of one of said high level operators further comprises another one of said high level operators.

23. The system of claim 21 wherein said recursion comprises one of an inward recursion beginning at a tip joint and concluding at a base joint of said robot and an outward recursion beginning at said base joint and concluding at said tip joint.

24. The system of claim 21 wherein one of said high level operators corresponds to a linearized robot dynamic model and at least some of the fifth type of operators thereof comprise partial derivatives of others of said fifth type of operators.

25. The system of claim 21 further comprising designer input means external of said robot and connected to said second compiler means for naming a high level operator and for selecting plural ones of said low level operators and specifying connections among the selected plural low level operators corresponding to a sequence of said low level operators to which said second compiler means translates the high level operator named by said input means.

26. The system of claim 21 wherein said first and second compiler means reside within said robot.

27. The system of claim 22 further comprising user input means external of said robot for entering said high level program statements into said robot architecture memory means.

28. A method for controlling a multi-link, multi-joint robot with a processor controlling joint servos and responsive to joint sensors for executing arithmetic instructions, said method comprising:
compiling each one of a selected sequence of plural low level spatial operators to a corresponding sequence of arithmetic instructions and transmitting said sequence of arithmetic instructions to processor, said set of said low level operators comprising a first type of operator for performing a coordinate transformation to a frame of reference of a current robot link, a second type of operator for propagating vector quantities across at least one of said current robot link and a corresponding robot joint, a third type of operator comprising a combination of operators of said second type, a fourth type of operator for performing a recursion of plural operators of said third type across plural robot links of a robot member, a fifth type of operator including operators produced from operators of said fourth type, and a sixth type of operator for combining operators of said fifth type;
translating each one of a set of plural high level operators to a corresponding sequence of at least some of said low level operators and transmitting said sequence of low level operators as said selected sequence for said compiling step, said sequence of low level operators comprising plural iterations associated with plural discrete points in time, each iteration comprising a first, second, third, fourth, fifth and sixth levels comprising, respectively, low level operators of said first, second, third, fourth, fifth and sixth types, whereby each high level operator comprises a modular assembly of ones of said low level operators.

29. The method of claim 28 further comprising:
storing high level program statements in an order which includes selected ones of said high level operators whereby to define a particular robot architecture, and transmitting said statements as said set of plural high level operators for said translating step.

30. The method of claim 28 wherein fifth type of operator comprises a Kalman transition operator and said sixth type of operator comprises an operator which performs a Kalman filter operation in combining said operators of said fifth type.

31. The method of claim 30 wherein said Kalman filter provides a Kalman gain for each one of said links, and wherein said second type of operator which propagates vector quantities across a robot joint comprises the Kalman gain of said corresponding robot joint.

32. The method of claim 30 wherein said fifth type of operator further comprises a robot joint axis projection operator and a pickoff projection operator.

33. The method of claim 28 wherein the sequence of low level operators of one of said high level operators further comprises another one of said high level operators at one of said first, second and third levels.

34. The method of claim 28 wherein said recursion comprises one of an inward recursion beginning at a tip joint and concluding at a base joint of said robot and an outward recursion beginning at said base joint and concluding at said tip joint.

35. The method of claim 28 wherein one of said high level operators corresponds to a linearized robot dynamic model and at least some of the fifth type of operators thereof comprise partial derivatives of others of said fifth type of operators.

36. The method of claim 32 further comprising naming a high level operator, selecting plural ones of said low level operators and specifying connections among the selected plural low level operators corresponding to a sequence of said low level operators to which said translating step translates the named high level operator.

* * * * *